US012571993B2

(12) United States Patent
You

(10) Patent No.: US 12,571,993 B2
(45) Date of Patent: Mar. 10, 2026

(54) OPTICAL SYSTEM

(71) Applicant: Samsung Electro-Mechanics Co., Ltd.,
Suwon-si (KR)

(72) Inventor: Ho Sik You, Suwon-si (KR)

(73) Assignee: Samsung Electro-Mechanics Co., Ltd.,
Suwon-si (KR)

( * ) Notice: Subject to any disclaimer, the term of this
patent is extended or adjusted under 35
U.S.C. 154(b) by 0 days.

(21) Appl. No.: 18/413,470

(22) Filed: Jan. 16, 2024

(65) Prior Publication Data

US 2024/0151946 A1 May 9, 2024

Related U.S. Application Data

(63) Continuation of application No. 16/939,297, filed on
Jul. 27, 2020, now Pat. No. 11,914,104, which is a
continuation of application No. 14/926,894, filed on
Oct. 29, 2015, now Pat. No. 10,761,300.

(30) Foreign Application Priority Data

Nov. 17, 2014 (KR) ........................ 10-2014-0160281

(51) Int. Cl.
G02B 13/00 (2006.01)
G02B 9/62 (2006.01)
G02B 13/18 (2006.01)

(52) U.S. Cl.
CPC ........... G02B 13/0045 (2013.01); G02B 9/62
(2013.01); G02B 13/18 (2013.01)

(58) Field of Classification Search
CPC ............................. G02B 13/0045; G02B 9/62
See application file for complete search history.

(56) References Cited

U.S. PATENT DOCUMENTS

| | | | |
|---|---|---|---|
| 8,477,431 B2 | 7/2013 | Huang | |
| 9,036,272 B2 | 5/2015 | Huang | |
| 9,046,672 B2 | 6/2015 | You | |
| 9,285,568 B2 | 3/2016 | Yamazaki et al. | |
| 2002/0075570 A1 | 6/2002 | Yamakawa | |
| 2009/0059395 A1 | 3/2009 | Lin et al. | |

(Continued)

FOREIGN PATENT DOCUMENTS

| | | |
|---|---|---|
| CN | 202975455 U | 6/2013 |
| CN | 103676088 A | 3/2014 |

(Continued)

OTHER PUBLICATIONS

Gross et al. "Handbook of Optical Systems vol. 3: Aberration
Theory and Correction of Optical Systems" Weinheim Germany,
WILEY-VCH Verlag Gmbh & Co. KGaA, pp. 377-379 (Year:
2007).*

(Continued)

*Primary Examiner* — Cara E Rakowski
(74) *Attorney, Agent, or Firm* — NSIP Law

(57) ABSTRACT

An optical system includes a first lens, a second lens, a third
lens, a fourth lens, a fifth lens, and a sixth lens. The first lens
includes an object-side surface that is convex with a menis-
cus shape. The second lens includes an image-side surface
that is convex. The third lens includes an image-side surface
that is concave. The fifth lens includes an image-side surface
that is concave. The first to sixth lenses are sequentially
disposed from an object side to an image side.

17 Claims, 45 Drawing Sheets

(56) References Cited

U.S. PATENT DOCUMENTS

| | | | |
|---|---|---|---|
| 2013/0120858 A1 | 5/2013 | Sano | |
| 2013/0314804 A1 | 11/2013 | Kubota et al. | |
| 2013/0342918 A1 | 12/2013 | Kubota et al. | |
| 2014/0043695 A1 | 2/2014 | Hsu et al. | |
| 2014/0063323 A1 | 3/2014 | Yamazaki et al. | |
| 2014/0078603 A1 | 3/2014 | You | |
| 2014/0211324 A1 | 7/2014 | Ishizaka | |
| 2015/0029599 A1 | 1/2015 | Huang | |
| 2015/0062721 A1* | 3/2015 | Kim | G02B 13/18 |
| | | | 359/713 |
| 2015/0109684 A1 | 4/2015 | Son | |
| 2015/0131172 A1 | 5/2015 | Park et al. | |
| 2015/0177493 A1 | 6/2015 | Asami | |
| 2015/0319389 A1 | 11/2015 | Huang | |
| 2016/0004042 A1 | 1/2016 | Kubota et al. | |
| 2016/0004044 A1 | 1/2016 | Kubota et al. | |
| 2016/0054543 A1 | 2/2016 | Nabeta | |
| 2016/0062083 A1 | 3/2016 | Hsueh et al. | |
| 2016/0124188 A1 | 5/2016 | Chen et al. | |
| 2016/0131899 A1 | 5/2016 | Jo | |
| 2016/0231533 A1 | 8/2016 | Mercado | |
| 2016/0282588 A1 | 9/2016 | Sekine et al. | |

| | | | |
|---|---|---|---|
| 2017/0003482 A1 | 1/2017 | Chen | |
| 2017/0045717 A1 | 2/2017 | Park | |
| 2017/0371130 A1 | 12/2017 | Huang et al. | |

FOREIGN PATENT DOCUMENTS

| | | | |
|---|---|---|---|
| CN | 104133283 A | 11/2014 | |
| JP | 2006-163075 A | 6/2006 | |
| KR | 10-2014-0035829 A | 3/2014 | |
| TW | 201344237 A | 11/2013 | |
| WO | WO 2012/008357 A1 | 1/2012 | |
| WO | WO 2014/162779 A1 | 10/2014 | |

OTHER PUBLICATIONS

Korean Office Action issued on Jun. 1, 2016, in counterpart Korean Application No. 10-2014-0160281 (12 pages in English, 8 pages in Korean).

Chinese Office Action issued in counterpart Chinese Application No. 201510784123.3 on Jul. 27, 2017 (11 pages in English; 8 pages in Chinese).

Chinese Office Action issued on May 26, 2020, in corresponding Chinese Patent Application No. 201811085013.8 (4 pages in English, 6 pages in Chinese).

* cited by examiner

| Surface | Radius | Thickness | Index | Abbe |
|---|---|---|---|---|
| 1 | 2.400 | 0.431 | 1.5441 | 56.11 |
| 2 | 5.623 | 0.124 | | |
| 3 | 3.513 | 0.547 | 1.5441 | 56.11 |
| 4 | -5.309 | 0.030 | | |
| 5 | 14.665 | 0.250 | 1.6385 | 23.23 |
| 6 | 2.464 | 0.440 | | |
| 7 | -45.411 | 0.369 | 1.6385 | 23.23 |
| 8 | -17.583 | 0.468 | | |
| 9 | 4.787 | 0.700 | 1.6385 | 23.23 |
| 10 | 3.929 | 0.191 | | |
| 11 | 2.285 | 0.730 | 1.5343 | 55.66 |
| 12 | 1.556 | 0.253 | | |
| 13 | Infinity | 0.110 | 1.5163 | 55.13 |
| 14 | Infinity | 0.556 | | |

FIG. 4

| Surface | S1 | S2 | S3 | S4 | S5 | S6 | S7 | S8 | S9 | S10 | S11 | S12 |
|---|---|---|---|---|---|---|---|---|---|---|---|---|
| R | 2.3996408 | 5.6234789 | 3.5129245 | -5.308835 | 14.664647 | 2.4635975 | -45.4109 | -17.5827 | 4.787209 | 3.928708208 | 2.2849607793 | 1.5562537763 |
| K | -1.800906 | 0 | 0 | 0 | 0 | 0.6115387 | 0 | 0 | 0 | 0 | -0.6630998227 | -4.9249919299 |
| A | -0.034592 | -0.130994 | -0.084798 | -0.045056 | -0.080466 | -0.066982 | -0.05456 | -0.06556 | -0.00271 | -0.008085944 | -0.2186660075 | -0.088907143 |
| B | -0.029269 | -0.087129 | -0.004352 | -0.015792 | 0.0627039 | 0.0914926 | -0.041 | -0.08373 | -0.1075 | -0.062289974 | 0.065724723 | 0.027138681 |
| C | 0.0116167 | 0.09144425 | 0.1113531 | 0.0796279 | -0.008389 | -0.101347 | 0.172591 | 0.214589 | 0.073477 | 0.04096151 | -0.009869708 | -0.005222531 |
| D | -0.038236 | -0.072115 | -0.04711 | -0.114241 | -0.073216 | 0.0853448 | -0.73246 | -0.23442 | -0.02462 | -0.01477077566 | 0.090716012 | 0.000624501 |
| E | 0.0447723 | 0.037295 | 0.018667 | 0.0778409 | 0.0959445 | -0.037725 | 0.169024 | 0.138163 | 0.008954 | 0.003114472 | 1.98997E-05 | -4.21316E-05 |
| F | -0.014311 | -0.009401 | 0.0113552 | -0.019771 | -0.023477 | 0.0115727 | -0.06174 | -0.0446 | 0.001428 | -0.000354796 |  | 1.19468E-06 |
| G |  |  |  |  |  |  | 0.007346 | 0.005576 | -0.0026 | 1.67213E-05 |  |  |

FIG. 5

| Surface | Radius | Thickness | Index | Abbe |
|---|---|---|---|---|
| 1 | 2.325 | 0.414 | 1.5441 | 56.11 |
| 2 | 4.870 | 0.111 | | |
| 3 | 3.313 | 0.546 | 1.5441 | 56.11 |
| 4 | -5.940 | 0.030 | | |
| 5 | 9.973 | 0.250 | 1.6385 | 23.23 |
| 6 | 2.378 | 0.411 | | |
| 7 | -6236.862 | 0.358 | 1.6385 | 23.23 |
| 8 | -24.978 | 0.447 | | |
| 9 | 3.933 | 0.576 | 1.6385 | 23.23 |
| 10 | 3.304 | 0.228 | | |
| 11 | 2.051 | 0.662 | 1.5343 | 55.66 |
| 12 | 1.448 | 0.225 | | |
| 13 | Infinity | 0.110 | 1.5163 | 55.13 |
| 14 | Infinity | 0.628 | | |

FIG. 9

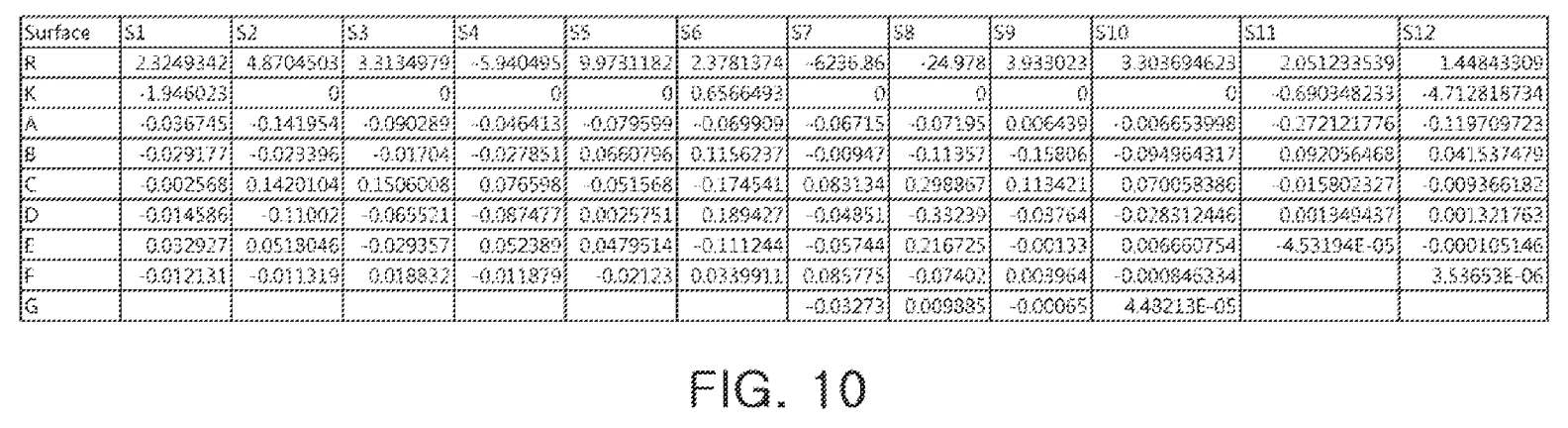

| Surface | S1 | S2 | S3 | S4 | S5 | S6 | S7 | S8 | S9 | S10 | S11 | S12 |
|---|---|---|---|---|---|---|---|---|---|---|---|---|
| R | 2.3249342 | 4.8704503 | 3.1134979 | -5.3404495 | 9.9731182 | 2.3781374 | -6.236.86 | -24.978 | 3.943022 | 3.3036946.23 | 2.0512235539 | 1.44843309 |
| K | -1.9460231 | 0 | 0 | 0 | 0 | 0.6566493 | 0 | 0 | 0 | 0 | -0.690348233 | -4.712818734 |
| A | -0.036745 | -0.141954 | -0.090289 | -0.046413 | -0.079599 | -0.069909 | -0.06715 | -0.07195 | 0.006439 | -0.006653948 | -0.772121776 | -0.119769723 |
| B | -0.029177 | -0.023396 | -0.01704 | -0.027851 | 0.0660796 | 0.1156237 | -0.09947 | -0.11357 | -0.15806 | -0.094864317 | 0.092056468 | 0.041537479 |
| C | -0.002568 | 0.1420104 | 0.1506008 | 0.076598 | -0.051568 | -0.174541 | 0.083134 | 0.298967 | 0.113421 | 0.070053386 | -0.015902327 | -0.009366182 |
| D | -0.014586 | -0.11002 | -0.065521 | -0.087477 | 0.0026751 | 0.189427 | -0.04951 | -0.33239 | -0.05764 | -0.028312446 | 0.001349437 | 0.0013.21762 |
| E | 0.029277 | 0.0518046 | -0.029357 | 0.052289 | 0.0478514 | -0.111244 | -0.05744 | 0.216725 | -0.00133 | 0.006660754 | -4.53194E-05 | -0.000105146 |
| F | -0.012731 | -0.011319 | 0.018832 | -0.011879 | -0.02123 | 0.0369911 | 0.085775 | -0.07401 | 0.003964 | -0.000846334 | | 3.53653E-06 |
| G | | | | | | | -0.03273 | 0.009385 | -0.000655 | 4.43213E-05 | | |

FIG. 10

| Surface | Radius | Thickness | Index | Abbe |
|---|---|---|---|---|
| 1 | 2.200 | 0.409 | 1.5441 | 56.11 |
| 2 | 4.230 | 0.075 | | |
| 3 | 2.988 | 0.502 | 1.5441 | 56.11 |
| 4 | -6.366 | 0.030 | | |
| 5 | 7.550 | 0.250 | 1.6385 | 23.23 |
| 6 | 2.216 | 0.395 | | |
| 7 | -8.848 | 0.364 | 1.6385 | 23.23 |
| 8 | -6.699 | 0.428 | | |
| 9 | 3.193 | 0.408 | 1.6385 | 23.23 |
| 10 | 2.759 | 0.279 | | |
| 11 | 2.025 | 0.617 | 1.5343 | 55.66 |
| 12 | 1.449 | 0.225 | | |
| 13 | Infinity | 0.112 | 1.5163 | 55.13 |
| 14 | Infinity | 0.704 | | |

FIG. 14

| Surface | S1 | S2 | S3 | S4 | S5 | S6 | S7 | S8 | S9 | S10 | S11 | S12 |
|---|---|---|---|---|---|---|---|---|---|---|---|---|
| R | 2.2 | 4.2296672 | 2.93834009 | -6.366061 | 7.5502976 | 2.2155448 | -8.84796 | -6.69928 | 3.192651 | 2.75901123 | 2.024773581 | 1.449367148 |
| K | -2.556073 | 0 | 0 | 0 | 0 | 0.7812339 | 0 | 0 | 0 | 0 | -0.676960624 | -4.72476252 |
| A | -0.03863 | -0.21101 | -0.132893 | -0.029797 | -0.077662 | -0.070031 | -0.04971 | -0.05949 | -0.00062 | -0.039987097 | -0.326444902 | -0.1483424 |
| B | -0.043751 | -0.0191331 | -0.032001 | -0.145364 | -0.049869 | 0.0781208 | -0.0896 | -0.1888 | -0.19911 | -0.103823184 | 0.1151444498 | 0.059516815 |
| C | 0.0114042 | 0.35608863 | 0.4778711 | 0.49320034 | 0.329774 | -0.084476 | 0.324127 | 0.466845 | 0.172069 | 0.092285679 | -0.020032259 | -0.0168001 |
| D | -0.062259 | -0.440917 | -0.567261 | -0.811875 | -0.646693 | 0.1061662 | -0.45474 | -0.59613 | -3.07719 | -0.043503698 | 0.001707885 | 0.003086347 |
| E | 0.1041421 | 0.2861429 | 0.3147013 | 0.6866712 | 0.5268473 | -0.0772226 | 0.339189 | 0.463895 | 0.0011259 | 0.0113732041 | -5.663146E-05 | -0.000302791 |
| F | -0.043643 | -0.084367 | -0.083507 | -0.233932 | -0.225474 | 0.0387355 | -0.09896 | -0.19206 | 0.00241 | -0.091153243 | 1.2744E-05 | |
| G | | | | | | | -0.07147 | 0.037228 | -0.00265 | 8.20386E-05 | | |

FIG. 15

| Surface | Radius | Thickness | Index | Abbe |
|---|---|---|---|---|
| 1 | 2.354 | 0.437 | 1.5441 | 56.11 |
| 2 | 4.948 | 0.147 | | |
| 3 | 3.158 | 0.544 | 1.5441 | 56.11 |
| 4 | -5.828 | 0.030 | | |
| 5 | 13.267 | 0.250 | 1.6385 | 23.23 |
| 6 | 2.357 | 0.460 | | |
| 7 | 32.495 | 0.352 | 1.6385 | 23.23 |
| 8 | -81.992 | 0.465 | | |
| 9 | 4.608 | 0.698 | 1.6385 | 23.23 |
| 10 | 3.792 | 0.224 | | |
| 11 | 2.411 | 0.720 | 1.5343 | 55.66 |
| 12 | 1.577 | 0.224 | | |
| 13 | Infinity | 0.110 | 1.5163 | 55.13 |
| 14 | Infinity | 0.538 | | |

FIG. 19

| Surface | S1 | S2 | S3 | S4 | S5 | S6 | S7 | S8 | S9 | S10 | S11 | S12 |
|---|---|---|---|---|---|---|---|---|---|---|---|---|
| R | 2.3540339 | 4.9482304 | 3.1579616 | -5.877687 | 13.266525 | 2.3573251 | 32.49464 | -81.9918 | 4.60313 | 3.791790131 | 2.411325494 | 1.577192223 |
| K | -1.963154 | 0 | 0 | 0 | 0 | 0.6069435 | 0 | 0 | 0 | 0 | -0.6011352461 | -5.163811838 |
| A | -0.026784 | -0.109767 | -0.068168 | -0.011644 | -0.051231 | -0.064689 | -0.042 | -0.04822 | 0.000226 | -0.0076299 | -0.2193469951 | -0.094035865 |
| B | -0.021172 | -0.015001 | -0.011948 | -0.134757 | -0.050076 | 0.0722597 | -0.0575 | -0.10966 | -0.11357 | -0.06746661 | 0.066616831 | 0.0272823 |
| C | -0.004459 | 0.0650364 | 0.0590315 | 0.3068266 | 0.2196593 | -0.061548 | 0.185169 | 0.246013 | 0.077254 | 0.044457366 | -0.010126374 | -0.004630371 |
| D | -0.004938 | -0.031316 | 0.0355894 | 0.321778 | -0.280213 | 0.0489019 | -0.23792 | -0.25061 | -0.02554 | -0.016105 | 0.000767535 | 0.000457438 |
| E | 0.0128312 | 0.0095734 | -0.067743 | 0.16389117 | 0.165995 | -0.024045 | 0.166343 | 0.149904 | 0.000571 | 0.003463278 | -2.312116-05 | -2.461546-05 |
| F | -0.003849 | -0.001899 | 0.02115384 | -0.033799 | -0.036988 | 0.0092646 | -0.061106 | -0.04732 | 0.001777 | -0.003401182 | | 5.6d502E-07 |
| G | | | | | | | 0.0079494 | 0.005884 | -0.00029 | 1.9434E-05 | | |

FIG. 20

| Surface | Radius | Thickness | Index | Abbe |
|---|---|---|---|---|
| 1 | 2.250 | 0.411 | 1.5441 | 56.11 |
| 2 | 5.219 | 0.083 | | |
| 3 | 3.718 | 0.545 | 1.5441 | 56.11 |
| 4 | -4.654 | 0.030 | | |
| 5 | 15.263 | 0.250 | 1.6385 | 23.23 |
| 6 | 2.447 | 0.394 | | |
| 7 | -52.918 | 0.351 | 1.6385 | 23.23 |
| 8 | -26.109 | 0.419 | | |
| 9 | 4.511 | 0.683 | 1.6385 | 23.23 |
| 10 | 3.721 | 0.199 | | |
| 11 | 2.125 | 0.710 | 1.5343 | 55.66 |
| 12 | 1.515 | 0.235 | | |
| 13 | Infinity | 0.110 | 1.5163 | 55.13 |
| 14 | Infinity | 0.579 | | |

FIG. 24

| Surface | S1 | S2 | S3 | S4 | S5 | S6 | S7 | S8 | S9 | S10 | S11 | S12 |
|---|---|---|---|---|---|---|---|---|---|---|---|---|
| R | 2.25 | 5.2191134 | 3.7181754 | -4.654345 | 15.263058 | 2.4466308 | -52.9179 | -26.1092 | 4.510586 | 3.721430057 | 2.124566672 | 1.515276865 |
| K | -2.171683 | 0 | 0 | 0 | 0 | 0.7029574 | 0 | 0 | 0 | 0 | -0.680218321 | -4.798138892 |
| A | -0.033736 | -0.172828 | -0.119688 | -0.03785 | -0.071937 | -0.064718 | -0.05891 | -0.07635 | -0.09454 | -0.022025575 | -0.251590336 | -0.109996361 |
| B | -0.03207 | 0.0148121 | 0.0180592 | -0.056852 | 0.0056931 | 0.0798634 | -0.04472 | -0.10704 | -0.1446 | -0.057783491 | 0.081086989 | 0.031281705 |
| C | -0.006378 | 0.1096376 | 0.202002 | 0.1922782 | 0.1134378 | -0.0896705 | 0.2238659 | 0.291744 | 0.123761 | 0.040154404 | -0.013197955 | -0.006249358 |
| D | -0.030131 | -0.015985 | -0.094405 | -0.2705 | -0.235767 | 0.1043895 | -0.32798 | -0.32115 | -0.0685 | -0.014780421 | 0.001080511 | 0.000759768 |
| E | 0.0611456 | -0.075556 | -0.079195 | 0.1696283 | 0.2141581 | -0.061275 | 0.258336 | 0.208204 | 0.023674 | 0.003144413 | -3.563904E-05 | -5.01341E-05 |
| F | -0.025379 | 0.0414679 | 0.0480525 | -0.040641 | -0.064527 | 0.023505 | -0.10404 | -0.07113 | -0.00526 | 0.009360248 |  | 1.38602E-06 |
| G |  |  |  |  |  |  | 0.014454 | 0.009426 | 0.006607 | 1.69161E-05 |  |  |

FIG. 25

| Surface | Radius | Thickness | Index | Abbe |
|---|---|---|---|---|
| 1 | 2.200 | 0.381 | 1.5441 | 56.11 |
| 2 | 3.825 | 0.070 | | |
| 3 | 2.944 | 0.508 | 1.5441 | 56.11 |
| 4 | -4.955 | 0.030 | | |
| 5 | 9.706 | 0.250 | 1.6385 | 23.23 |
| 6 | 2.299 | 0.384 | | |
| 7 | -10.570 | 0.365 | 1.6385 | 23.23 |
| 8 | -7.923 | 0.462 | | |
| 9 | 3.188 | 0.555 | 1.6385 | 23.23 |
| 10 | 2.703 | 0.287 | | |
| 11 | 1.986 | 0.529 | 1.5343 | 55.66 |
| 12 | 1.393 | 0.235 | | |
| 13 | Infinity | 0.110 | 1.5163 | 55.13 |
| 14 | Infinity | 0.633 | | |

FIG. 29

| Surface | S1 | S2 | S3 | S4 | S5 | S6 | S7 | S8 | S9 | S10 | S11 | S12 |
|---|---|---|---|---|---|---|---|---|---|---|---|---|
| R | 2.2 | 3.8253699 | 2.9439896 | -4.955327 | 9.7055155 | 2.2934309 | -10.5703 | -7.92249 | 3.187588 | 2.702340735 | 1.985949511 | 1.392971363 |
| K | -2.623442 | 0 | 0 | 0 | 0 | 0.7777099 | 0 | 0 | 0 | 0 | -0.674608137 | -4.956709411 |
| A | -0.041356 | -0.204512 | -0.126237 | -0.018857 | -0.072995 | -0.07804 | -0.07304 | -0.11046 | -0.08118 | -0.093317041 | -0.341636037 | -0.154451266 |
| B | -0.059967 | -0.018613 | -0.024163 | -0.157791 | -0.053734 | 0.102599 | 0.00812 | -0.03835 | -0.09732 | -0.027019782 | 0.125932011 | 0.060176523 |
| C | -0.0115 | 0.25233819 | 0.32546674 | 0.44920095 | 0.31626353 | -0.119927 | 0.206231 | 0.269829 | 0.105917 | 0.035725868 | -0.023275261 | -0.015365617 |
| D | -0.024777 | -0.106895 | -0.133529 | -0.638623 | -0.559768 | 0.1391769 | 0.36726 | -0.38951 | -0.06768 | -0.016739289 | 0.022145602 | 0.002418141 |
| E | 0.0068868 | -0.083224 | -0.166033 | 0.47173849 | 0.495879 | -0.099352 | 0.347216 | 0.321939 | 0.026618 | 0.004183327 | -7.93513E-05 | -0.002209076 |
| F | -0.04896 | 0.05356838 | 0.0977826 | -0.148581 | -0.162503 | 0.0474657 | -0.16923 | -0.13753 | -0.00725 | -0.000542189 |  | 7.49046E-06 |
| G |  |  |  |  |  |  | 0.023357 | 0.032607 | 0.001034 | 2.85049E-05 |  |  |

FIG. 30

| Surface | Radius | Thickness | Index | Abbe |
|---|---|---|---|---|
| 1 | 2.273 | 0.440 | 1.5441 | 56.11 |
| 2 | 4.911 | 0.139 | | |
| 3 | 3.482 | 0.519 | 1.5441 | 56.11 |
| 4 | -6.371 | 0.030 | | |
| 5 | 7.172 | 0.250 | 1.6385 | 23.23 |
| 6 | 2.265 | 0.458 | | |
| 7 | 57.298 | 0.367 | 1.6385 | 23.23 |
| 8 | -165.464 | 0.522 | | |
| 9 | 4.507 | 0.886 | 1.6385 | 23.23 |
| 10 | 3.638 | 0.219 | | |
| 11 | 2.440 | 0.539 | 1.5343 | 55.66 |
| 12 | 1.518 | 0.180 | | |
| 13 | Infinity | 0.110 | 1.5163 | 55.13 |
| 14 | Infinity | 0.539 | | |

FIG. 34

| Surface | S1 | S2 | S3 | S4 | S5 | S6 | S7 | S8 | S9 | S10 | S11 | S12 |
|---|---|---|---|---|---|---|---|---|---|---|---|---|
| R | 2.2732199 | 4.9110409 | 3.4822505 | -6.370652 | 7.1717254 | 2.2648529 | 57.29827 | -165.464 | 4.507311 | 3.698380998 | 2.439638875 | 1.518425024 |
| K | -2.013001 | 0 | 0 | 0 | 0 | 0.4634283 | 0 | 0 | 0 | 0 | -0.573633115 | -5.650467253 |
| A | -0.023982 | -0.105896 | -0.061289 | 0.00592 | -0.041214 | -0.068604 | -0.05283 | -0.07422 | -0.04668 | -0.049678218 | -0.284006309 | -0.136237157 |
| B | -0.028686 | -0.017332 | -0.013578 | -0.152283 | -0.072887 | 0.06867965 | -0.024 | -0.03435 | -0.06143 | -0.050485198 | 0.106702847 | 0.049140384 |
| C | -0.014295 | 0.0420405 | 0.06098595 | 0.326.2841 | 0.2389066 | -0.071397 | 0.1556669 | 0.156944 | 0.045955 | 0.025539689 | -0.013556437 | -0.009081703 |
| D | 0.0033883 | 0.024515 | 0.0502326 | -0.337699 | -0.285154 | 0.0892503 | -0.26175 | -0.19695 | -0.01485 | -0.011132203 | 0.001720982 | 0.000943233 |
| E | 0.0028916 | 0.04256 | -0.0388664 | 0.1661806 | 0.1589617 | -0.0658 | 0.230118 | 0.13524 | -0.00412 | 0.002864137 | 5.822267E-05 | -5.47497E-05 |
| F | -0.0002897 | 0.0148038 | 0.0277931 | -0.033085 | -0.031778 | 0.0354481 | -0.10226 | -0.0466 | 0.003603 | -0.000397644 | | 1.35851E-06 |
| G | | | | | | | 0.0172 | 0.006135 | -0.00058 | 2.25753E-05 | | |

FIG. 35

| Surface | Radius | Thickness | Index | Abbe |
|---|---|---|---|---|
| 1 | 1.780 | 0.420 | 1.5441 | 56.11 |
| 2 | 2.314 | 0.120 | | |
| 3 | 2.411 | 0.510 | 1.5441 | 56.11 |
| 4 | -9.681 | 0.030 | | |
| 5 | 12.094 | 0.270 | 1.6504 | 21.52 |
| 6 | 2.627 | 0.370 | | |
| 7 | 102.310 | 0.400 | 1.6504 | 21.52 |
| 8 | -14.614 | 0.540 | | |
| 9 | 3.567 | 0.500 | 1.6504 | 21.52 |
| 10 | 3.026 | 0.300 | | |
| 11 | 2.956 | 0.600 | 1.5343 | 55.66 |
| 12 | 1.705 | 0.179 | | |
| 13 | Infinity | 0.110 | 1.5163 | 55.13 |
| 14 | Infinity | 0.621 | | |

FIG. 39

| Surface | S1 | S2 | S3 | S4 | S5 | S6 | S7 | S8 | S9 | S10 | S11 | S12 |
|---|---|---|---|---|---|---|---|---|---|---|---|---|
| R | 1.78 | 2.3137088 | 2.4108186 | -9.680936 | 12.09418 | 2.6271913 | 102.3099 | -14.6143 | 3.5669 | 3.026607599 | 2.955564286 | 1.705490211 |
| K | -0.372825 | 0 | 0 | 0 | 0 | 1.2625845 | 0 | 0 | 0 | 0 | -0.005581517 | -7.489584804 |
| A | -0.016476 | -0.063975 | -0.051451 | -0.050164 | -0.071038 | -0.060843 | -0.0629 | -0.07456 | -0.05875 | -0.036685753 | -0.260106191 | -0.10978.2376 |
| B | -0.002976 | -0.036656 | -0.045221 | 0.0470228 | 0.137968 | 0.1221535 | 0.053058 | 0.021178 | -0.06575 | -0.047701225 | 0.091783252 | 0.031563455 |
| C | -0.025062 | 0.0844711 | 0.0593697 | -0.186614 | -0.256294 | -0.174562 | -0.06607 | 0.0448 | 0.039806 | 0.040125644 | -0.016465422 | -0.005040489 |
| D | 0.0524392 | -0.093619 | -0.067179 | 0.3052114 | 0.3270485 | 0.1775397 | 0.144461 | 0.05449 | -0.00701 | -0.017055362 | 0.0014896322 | 0.0003384925 |
| E | -0.0309248 | 0.1124696 | 0.1204727 | -0.189361 | -0.1820276 | -0.107178 | -0.19382 | 0.044657 | -0.00538 | 0.004219562 | -5.48058E-05 | -9.59812E-06 |
| F | 0.0192741 | -0.044319 | -0.060318 | 0.0356312 | 0.0343862 | 0.0584847 | 0.127151 | -0.02061 | 0.003037 | 0.000561199 | | -1.050185-07 |
| G | | | | | | | -0.03624 | 0.003474 | -0.00042 | 3.053776-05 | | |

FIG. 40

| Surface | Radius | Thickness | Index | Abbe |
|---:|---:|---:|---:|---:|
| 1 | 1.969 | 0.465 | 1.5441 | 56.11 |
| 2 | 3.684 | 0.235 | | |
| 3 | 3.780 | 0.470 | 1.5441 | 56.11 |
| 4 | -11.922 | 0.030 | | |
| 5 | 6.421 | 0.250 | 1.6504 | 21.52 |
| 6 | 2.622 | 0.420 | | |
| 7 | -30.600 | 0.360 | 1.6504 | 21.52 |
| 8 | -9.474 | 0.653 | | |
| 9 | -1000.000 | 0.850 | 1.6504 | 21.52 |
| 10 | 150.993 | 0.073 | | |
| 11 | 4.057 | 0.700 | 1.5343 | 55.66 |
| 12 | 1.753 | 0.234 | | |
| 13 | Infinity | 0.110 | 1.5163 | 55.13 |
| 14 | Infinity | 0.630 | | |

FIG. 44

| Surface | S1 | S2 | S3 | S4 | S5 | S6 | S7 | S8 | S9 | S10 | S11 | S12 |
|---|---|---|---|---|---|---|---|---|---|---|---|---|
| R | 1.9693515 | 3.6842292 | 3.7802051 | -1.192211 | 6.4206627 | 2.622013 | -30.5997 | -9.47418 | -1000 | 150.993379 | 4.057160126 | 1.752798151 |
| K | -0.543507 | 0 | 0 | 0 | 0 | 0.8518058 | 0 | 0 | 0 | 0 | 0.0924469045 | -7.646728307 |
| A | -0.007845 | -0.02894 | -0.018803 | -0.084689 | -0.095045 | -0.047011 | -0.03621 | -0.03388 | 0.006576 | 0.050886398 | -0.131147032 | -0.056990381 |
| B | 0.0005182 | -0.01297 | -0.006062 | 0.12465599 | 0.1507514 | 0.0465333 | 0.000674 | -0.02671 | -0.05808 | -0.06726671 | 0.037894115 | 0.013781055 |
| C | -0.032919 | 0.0143502 | -0.015029 | -0.211556 | -0.213553 | -0.023436 | -0.00341 | 0.056098 | 0.012139 | 0.030411427 | -0.005891847 | -0.001615476 |
| D | 0.0545912 | 0.0038866 | 0.0734625 | 0.2809442 | 0.1809975 | -0.016968 | 0.056646 | -0.04863 | 0.010681 | -0.00856646 | 0.000520632 | 0.00012504 |
| E | -0.066095 | -0.016461 | -0.087207 | -0.0811 | -0.079436 | 0.0352369 | -0.08213 | 0.03127 | -0.01061 | 0.001497491 | -2.47855E-05 | -4.22538E-06 |
| F | 0.0373835 | 0.020089a | 0.0573197 | -0.002416 | 0.0170294 | -0.018568 | 0.050936 | -0.01137 | 0.003549 | -0.00014545 | 4.9328E-07 | 5.503346-08 |
| G | -0.008141 | -0.006452 | -0.014746 | 0.00940934 | -0.00142 | 0.0047431 | -0.01271 | 0.001514 | -0.0004 | 5.9103E-06 | | |

FIG. 45

OPTICAL SYSTEM

CROSS-REFERENCE TO RELATED APPLICATION

This application is a continuation of U.S. application Ser. No. 16/939,297, filed on Jul. 27, 2020, now U.S. Pat. No. 11,914,104, which is a continuation of U.S. application Ser. No. 14/926,894, filed on Oct. 29, 2015, now U.S. Pat. No. 10,761,300, which claims the priority and benefit under 35 USC 119(a) of Korean Patent Application No. 10-2014-0160281 filed on Nov. 17, 2014, with the Korean Intellectual Property Office, the entire disclosures of which are incorporated herein by reference.

BACKGROUND

1. Field

The following description relates to an optical system.

2. Description of Related Art

Mobile communications terminals normally include camera modules to capture images and record video calls. In addition, as levels of functionality of cameras in such mobile communications terminals have gradually increased, there is a demand for the camera modules in mobile communications terminals to have higher levels of resolution and performance.

However, because there is a trend for mobile communications terminals to be miniaturized and lightened, there are limitations in obtaining camera modules having high levels of resolution and high degrees of performance.

In order to resolve such issues, camera lenses in the camera modules have been formed of plastic, which is a material lighter than glass and the number of the camera lenses have been configured of five or more lenses to achieve high levels of resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical system, including: a first lens including an object-side surface that is convex with a meniscus shape; a second lens including an image-side surface that is convex; a third lens including an image-side surface that is concave; a fourth lens; a fifth lens including an image-side surface that is concave; and a sixth lens, wherein the first to sixth lenses are sequentially disposed from an object side to an image side.

The optical system may also include an image sensor configured to convert an image of a subject incident through the first through sixth lenses into an electrical signal, wherein TTL is a distance from the object-side surface of the first lens to an imaging surface of the image sensor and f is an overall focal length of the optical system satisfying $0.95<TTL/f<1.45$.

Where, f, an overall focal length of the optical system and, f1, a focal length of the first lens may satisfy $0<f/f1<1.5$.

Where, f, an overall focal length of the optical system and, f3, a focal length of the third lens may satisfy $0.2<|f/f3|<2.5$.

Where, f, an overall focal length of the optical system, f5, a focal length of the fifth lens, and, f6, a focal length of the sixth lens may satisfy $0.2<|f/f5|+|f/f6|<6.0$.

The optical system may also include an image sensor configured to convert an image of a subject incident through the first through sixth lenses into an electrical signal, wherein TTL is a distance from the object-side surface of the first lens to an imaging surface of the image sensor and f is a diagonal length of the imaging surface of the image sensor is ImgH, may satisfying $0.35<TTL/(2*ImgH)<0.95$.

FOV may be a field of view of the optical system satisfying $65<FOV<100$.

Where, f, an overall focal length of the optical system, f3, a focal length of the third lens, and, f4, a focal length of the fourth lens may satisfy $0<|f/f3|+|f/f4|<3$.

Where, f, an overall focal length of the optical system and, r12, a radius of curvature of an image-side surface of the sixth lens may satisfy $0.15<r12/f<0.9$.

Where, f1, a focal length of the first lens and, f3, a focal length of the third lens may satisfy $0<|f1/f3|<25$.

Where, r9, a radius of curvature of an object-side surface of the fifth lens and, r10, a radius of curvature of the image-side surface of the fifth lens may satisfy $0<(r9-r10)/(r9+r10)<2.5$.

Where, f, an overall focal length of the optical system, f1, a focal length of the first lens, and, f2, a focal length of the second lens may satisfy $0.2<|f/f1|+|f/f2|<4$.

Where, f, an overall focal length of the optical system and, DL, a distance from the object-side surface of the first lens to an image-side surface of the sixth lens may satisfy $0.7<DL/f<1.2$.

Where, v4, an Abbe number of the fourth lens and, v5, an Abbe number of the fifth lens may satisfy $42<v4+v5<115$.

Where, f, an overall focal length of the optical system and, f5, a focal length of the fifth lens may satisfy $|f5/f|>2$.

Where, f, an overall focal length of the optical system and, f12, a synthetic focal length of the first and second lenses may satisfy $0.5<f/f12<2.5$.

Where, f, an overall focal length of the optical system and, f12, a synthetic focal length of the third and fourth lenses may satisfy $-2.5<f/f34<-0.2$.

Where, v12, an average value of an Abbe number of the first lens and an Abbe number of the second lens and, v34, an average value of an Abbe number of the third lens and an Abbe number of the fourth lens may satisfy $10<v12-v34<45$.

At least one inflection point may be formed on at least one of an object-side surface and the image-side surface of the fifth lens, and an absolute value of a radius of curvature of the object-side surface of the fifth lens in a paraxial region may be larger than an absolute value of a radius of curvature of the image-side surface of the fifth lens in the paraxial region.

In accordance with an embodiment, there is provided an optical system, including: a first lens including a positive refractive power and an object-side surface that is convex; a second lens including a positive refractive power and an image-side surface that is convex; a third lens including a negative refractive power, an object-side surface that is convex, and an image-side surface that is concave; a fourth lens including refractive power; a fifth lens including a negative refractive power and an image-side surface that is concave; and a sixth lens including refractive power, wherein the first through sixth lenses are sequentially arranged from an object side to an image side.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which

FIG. 4 is a table illustrating respective characteristics of lenses in the optical system illustrated in FIG. 1;

FIG. 5 is a table illustrating respective aspherical surface coefficients of lenses in the optical system illustrated in FIG. 1;

FIG. 9 is a table illustrating respective characteristics of lenses in the optical system illustrated in FIG. 6;

FIG. 10 is a table illustrating respective aspherical surface coefficients of lenses in the optical system illustrated in FIG. 6;

FIG. 14 is a table illustrating respective characteristics of lenses in the optical system illustrated in FIG. 11;

FIG. 15 is a table illustrating respective aspherical surface coefficients of lenses in the optical system illustrated in FIG. 11;

FIG. 19 is a table illustrating respective characteristics of lenses in the optical system illustrated in FIG. 16;

FIG. 20 is a table illustrating respective aspherical surface coefficients of lenses in the optical system illustrated in FIG. 16;

FIG. 24 is a table illustrating respective characteristics of lenses in the optical system illustrated in FIG. 21;

FIG. 25 is a table illustrating respective aspherical surface coefficients of lenses in the optical system illustrated in FIG. 21;

FIG. 29 is a table illustrating respective characteristics of lenses in the optical system illustrated in FIG. 26;

FIG. 30 is a table illustrating respective aspherical surface coefficients of lenses in the optical system illustrated in FIG. 26;

FIG. 34 is a table illustrating respective characteristics of lenses in the optical system illustrated in FIG. 31;

FIG. 35 is a table illustrating respective aspherical surface coefficients of lenses in the optical system illustrated in FIG. 31;

FIG. 39 is a table illustrating respective characteristics of lenses in the optical system illustrated in FIG. 36;

FIG. 40 is a table illustrating respective aspherical surface coefficients of lenses in the optical system illustrated in FIG. 36;

FIG. 44 is a table illustrating respective characteristics of lenses in the optical system illustrated in FIG. 41; and FIG. 45 is a table illustrating respective aspherical surface coefficients of lenses in the optical system illustrated in FIG. 41.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
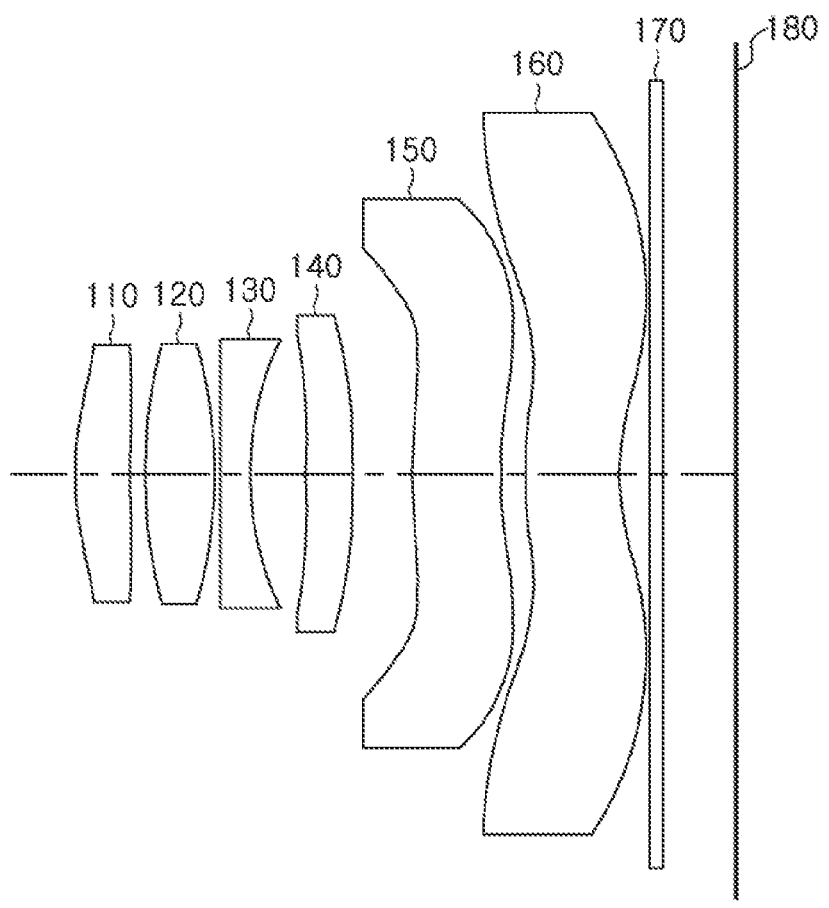
FIG. 1 is a view of an optical system, according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

In addition, a shape of each lens refers to a shape of a portion of the lens in a paraxial region, and the paraxial region refers to a very narrow region in the vicinity of an optical axis.

In addition, a first lens refers to a lens closest to an object, while a sixth lens refers to a lens closest to an image sensor.

In addition, a surface of each lens closest to an object is referred to as a first surface or an object-side surface, and a surface of each lens closest to an imaging surface is referred to as a second surface or an image-side surface. Further, all numerical values of radii of curvature, thicknesses, and other parameters of the lenses are represented in millimeters (mm).

In accordance with an illustrative example, the embodiments described of the optical system include six lenses. However, persons skilled in the relevant art will appreciate that the number of lenses in the optical system may vary, for example, between two to five lenses, while achieving the various results and benefits described hereinbelow.

In one example, the optical system includes a first lens, a second lens, a third lens, a fourth lens, a fifth lens, and a sixth lens.

However, the optical system is not limited to include six lenses, but may further include other components, if necessary. For example, the optical system includes a stop to control an amount of light. In addition, the optical system may further include an infrared cut-off filter filtering infrared light. Further, the optical system may further include an image sensor converting an image of a subject incident on the image sensor into electrical signals. Further, the optical system further includes a gap maintaining member to adjust a gap between lenses.

In the optical system, according to embodiments, the first to sixth lenses are formed of materials including glass, plastic or other similar types of polycarbonate materials. In another embodiment, at least one of the first through sixth lenses is formed of a material different from the materials forming the other first through sixth lenses.

In addition, at least one of the first to sixth lenses may have an aspherical object-side or image-side surface. Further, each of the first to sixth lenses may have at least one aspherical object-side or image-side surface.

That is, at least one of the first and second surfaces of the first to sixth lenses may be aspherical. In one example, the aspherical surfaces of the first to sixth lenses may be represented by the following Equation 1:

$$Z = \frac{cY^2}{1 + \sqrt{1 - (1 + K)c^2 Y^2}} +$$

$$AY^4 + BY^6 + CY^8 + DY^{10} + EY^{12} + Fy^{14} + \dots \qquad \text{Equation 1}$$

6

In this equation, c is a curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical surface coefficients, and Z is a distance between the certain point on the aspherical surface at the distance Y and a tangential plane meeting the apex of the aspherical surface of the lens.

Each of the first through sixth lenses has a refractive power, either negative or positive. For instance, in one configuration, from the object side towards the image side, the first lens has a positive refractive power, the second lens has a positive refractive power, the third lens has a negative refractive power, the fourth lens has a positive refractive power, the fifth lens has a negative refractive power, and the sixth lens has a negative refractive power. Persons skilled in the relevant art will appreciate that each of the first and sixth lenses may be configured in an opposite refractive power from the configuration described above. For example, in an alternative configuration, the first lens has a positive refractive power, the second lens has a positive refractive power, the third lens has a negative refractive power, the fourth lens has a negative refractive power, the fifth lens has a positive refractive power, and the sixth lens has a negative refractive power.

The optical system configured as described above improves optical performance through aberration improvement. In addition, in the optical system configured as described above, all of the six lenses is formed of plastic.

The optical system, according to embodiments, satisfies Conditional Expression 1.

$$0.95 < TTL/f < 1.45 \qquad \text{[Conditional Expression 1]}$$

In this expression, TTL is a distance from an object-side surface of the first lens to an imaging surface of the image sensor, and f is an overall focal length of the optical system.

When TTL/f is outside of the upper and lower limits of Conditional Expression 1, it may be difficult to realize a slim optical system.

The optical system, according to embodiments, satisfies Conditional Expression 2.

$$0.5 < f/f12 < 2.5 \qquad \text{[Conditional Expression 2]}$$

In this expression, f is the overall focal length of the optical system, and f12 is a synthetic focal length of the first and second lenses.

When f/f12 is outside of the upper and lower limits of Conditional Expression 2, it may be difficult to decrease sensitivity of the first and second lenses.

The optical system, according to embodiments, satisfies Conditional Expression 3.

$$-2.5 < f/f34 < -0.2 \qquad \text{[Conditional Expression 3]}$$

In this expression, f is the overall focal length of the optical system, and f34 is a synthetic focal length of the third and fourth lenses.

When f/f34 is outside of the upper and lower limits of Conditional Expression 3, it may be difficult to secure effective image formation performance.

The optical system, according to embodiments, satisfies Conditional Expression 4.

$$0 < f/f1 < 1.5 \qquad \text{[Conditional Expression 4]}$$

In this expression, f is the overall focal length of the optical system, and f1 is a focal length of the first lens.

When f/f1 is outside of the upper and lower limits of Conditional Expression 4, it may be difficult to decrease sensitivity of the first lens.

The optical system, according to embodiments, satisfies Conditional Expression 5.

$$0.2<|f/f3|<2.5 \qquad \text{[Conditional Expression 5]}$$

In this expression, f is the overall focal length of the optical system, and f3 is a focal length of the third lens.

When |f/f3| is outside of the upper and lower limits of Conditional Expression 5, it may be difficult to effectively offset chromatic aberration.

The optical system, according to embodiments, satisfies Conditional Expression 6.

$$0.2<|f/f5|+|f/f6|<6.0 \qquad \text{[Conditional Expression 6]}$$

In this expression, f is the overall focal length of the optical system, f5 is a focal length of the fifth lens, and f6 is a focal length of the sixth lens.

The optical system, according to embodiments, satisfies Conditional Expression 7.

$$0.35<TTL/(2*ImgH)<0.95 \qquad \text{[Conditional Expression 7]}$$

In this expression, TTL is the distance from the object-side surface of the first lens to the imaging surface of the image sensor, and ImgH is half a diagonal length of the imaging surface of the image sensor.

When TTL/(2*ImgH) is outside of the upper and lower limits of Conditional Expression 7, it may be difficult to realize a slim optical system.

The optical system, according to embodiments, satisfies Conditional Expression 8.

$$65<FOV<100 \qquad \text{[Conditional Expression 8]}$$

In this expression, FOV is a field of view of the optical system. In one example, a unit of the field of view of the optical system is a degree.

The optical system, according to embodiments, satisfies Conditional Expression 9.

$$10<v12-v34<45 \qquad \text{[Conditional Expression 9]}$$

In this expression, v12 is an average value of an Abbe number of the first lens and an Abbe number of the second lens, and v34 is an average value of an Abbe number of the third lens and an Abbe number of the fourth lens.

When v12−v34 is outside of the upper and lower limits of Conditional Expression 9, it may be difficult to effectively decrease chromatic aberration.

The optical system, according to embodiments, satisfies Conditional Expression 10.

$$0<|f/f3|+|f/f4|<3 \qquad \text{[Conditional Expression 10]}$$

In this expression, f is the overall focal length of the optical system, f3 is the focal length of the third lens, and f4 is a focal length of the fourth lens.

When |f/f3|+|f/f4| is outside of the upper and lower limits of Conditional Expression 10, it may be difficult to effectively correct aberration.

The optical system, according to embodiments, satisfies Conditional Expression 11.

$$0.15<r12/f<0.9 \qquad \text{[Conditional Expression 11]}$$

In this expression, f is the overall focal length of the optical system, and r12 is a radius of curvature of an image side surface of the sixth lens.

The optical system, according to embodiments, satisfies Conditional Expression 12.

$$0<|f1/f3|<25 \qquad \text{[Conditional Expression 12]}$$

In this expression, f1 is the focal length of the first lens, and f3 is the focal length of the third lens.

When |f1/f3| is outside of the upper and lower limits of Conditional Expression 12, it may be difficult to easily correct chromatic aberration.

The optical system, according to embodiments, satisfies Conditional Expression 13.

$$0<(r9-r10)/(r9+r10)<2.5 \qquad \text{[Conditional Expression 13]}$$

In this expression, r9 is a radius of curvature of an object-side surface of the fifth lens, and r10 is a radius of curvature of an image-side surface of the fifth lens.

When (r9−r10)/(r9+r10) is outside of the upper and lower limits of Conditional Expression 13, it may be difficult to realize a slim optical system.

The optical system, according to embodiments, satisfies Conditional Expression 14.

$$0.2<|f/f1|+|f/f2|<4 \qquad \text{[Conditional Expression 14]}$$

In this expression, f is the overall focal length of the optical system, f1 is the focal length of the first lens, and f2 is a focal length of the second lens.

The optical system, according to embodiments, satisfies Conditional Expression 15.

$$0.7<DL/f<1.2 \qquad \text{[Conditional Expression 15]}$$

In this expression, f is the overall focal length of the optical system, and DL is a distance from the object-side surface of the first lens to the image-side surface of the sixth lens.

When DL/f is outside of the upper and lower limits of Conditional Expression 15, it may be difficult to realize a slim optical system.

The optical system, according to embodiments, satisfies Conditional Expression 16.

$$42<v4+v5<115 \qquad \text{[Conditional Expression 16]}$$

In this expression, v4 is the Abbe number of the fourth lens, and v5 is an Abbe number of the fifth lens.

When v4+v5 is outside of the upper and lower limits of Conditional Expression 16, it may be difficult to realize a slim optical system.

The optical system, according to embodiments, satisfies Conditional Expression 17.

$$|f5/f|>2 \qquad \text{[Conditional Expression 17]}$$

In this expression, f is the overall focal length of the optical system, and f5 is the focal length of the fifth lens.

When |f5/f| is outside of the upper and lower limits of Conditional Expression 17, it may be difficult to realize a slim optical system.

The optical system, according to embodiments, satisfies Conditional Expression 18.

$$1.4<Fno<2.2 \qquad \text{[Conditional Expression 18]}$$

In this expression, Fno is a constant indicating brightness of the optical system.

Next, the first to sixth lenses configuring the optical system, according to embodiments, will be described.

The first lens has a positive refractive power. In addition, the first lens has a meniscus shape of which an object-side surface is convex. For example, a first surface of the first lens is convex, and a second surface of the first lens is concave.

At least one of the first and second surfaces of the first lens is aspherical. In an example, both surfaces of the first lens may be aspherical. In another example, neither of the first and second surfaces are aspherical.

The second lens has a positive refractive power. In addition, both first and second surfaces of the second lens have convex.

At least one of the first and second surfaces of the second lens may be aspherical. For example, both surfaces of the second lens are aspherical.

The third lens has a negative refractive power. In addition, the third lens has a meniscus shape of which an object-side surface is convex. In one example, a first surface of the third lens is convex, and a second surface of the third lens is concave. In an alternative configuration, the first surface of the third lens is substantially flat.

At least one of the first and second surfaces of the third lens is aspherical. For example, both surfaces of the third lens are aspherical. In another example, neither surface of the third lens is aspherical.

The fourth lens has a positive refractive power. In one configuration, the fourth lens has a meniscus shape of which an image-side surface is convex. For instance, a first surface of the fourth lens is concave, and a second surface of the fourth lens is convex.

Alternatively, both the first and second surfaces of the fourth lens may be convex.

At least one of the first and second surfaces of the fourth lens is aspherical. For example, both surfaces of the fourth lens are aspherical. In another example, neither surface of the fourth lens is aspherical.

The fifth lens has a negative refractive power. In addition, the fifth lens has a meniscus shape of which an object-side surface is convex. In detail, a first surface of the fifth lens is convex, and a second surface of the fifth lens is concave. In one example, end portions of the first surface of the fifth lens are substantially flat.

Alternatively, both the first and second surfaces of the fifth lens are concave.

At least one of the first and second surfaces of the fifth lens are aspherical. For example, both surfaces of the fifth lens are aspherical.

In addition, at least one inflection point is formed on at least one of the first and second surfaces of the fifth lens. For example, the second surface of the fifth lens is concave in the paraxial region and becomes convex at an edge thereof. In one example, an absolute value of a radius of curvature of the first surface of the fifth lens in a paraxial region is larger than an absolute value of a radius of curvature of the second surface of the fifth lens in the paraxial region.

The sixth lens has a negative refractive power. In addition, the sixth lens has a meniscus shape of which an object-side surface is convex. For instance, a first surface of the sixth lens is convex in the paraxial region, and a second surface of the sixth lens is concave in the paraxial region.

At least one of the first and second surfaces of the sixth lens is aspherical. For example, both surfaces of the sixth lens are aspherical. In another example, neither surface of the sixth lens is aspherical.

In addition, at least one inflection point is formed on at least one of the first and second surfaces of the sixth lens. For example, the first surface of the sixth lens is convex in the paraxial region and becomes concave at an edge thereof. Furthermore, the second surface of the sixth lens is concave in the paraxial region and becomes convex at an edge thereof.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

In a further alternative embodiment, two or more of the lenses of the first to sixth lenses may be configured as a group and in operative connection or contact with another lens. For instance, the first, second, and third lenses may be in contact with each other as a first group lens, while the fourth, fifth, and sixth lenses are configured separate from each other and from the first group lens. In the alternative, the first, second, and third lenses may be in contact with each other as a first group lens, the fourth and the fifth lenses may be in contact with each other as a second group lens, and the sixth lens is configured separate from the first and second group lenses.

In the optical system configured as described above, the lenses 110 through 160 perform an aberration correction function to improve aberration. The optical system is slim, realizes a wide field of view, and increases mass production yield by decreasing respective sensitivities of the lenses to secure tolerance control at the time at which the lenses are assembled.

An optical system, according to a first embodiment, will be described with reference to FIGS. 1 through 5.

The optical system, according to the first embodiment, includes a first lens 110, a second lens 120, a third lens 130, a fourth lens 140, a fifth lens 150, and a sixth lens 160. The optical system also includes a stop (not shown), an infrared cut-off filter 170, and an image sensor 180.

As illustrated in Table 1, a focal length (f1) of the first lens 110 is 7.347 mm, a focal length (f2) of the second lens 120 is 3.972 mm, a focal length (f3) of the third lens 130 is −4.675 mm, a focal length (f4) of the fourth lens 140 is 44.706 mm, a focal length (f5) of the fifth lens 150 is −50.273 mm, a focal length (f6) of the sixth lens 160 is −14.030 mm, and an overall focal length (f) of the optical system is 4.294 mm.

TABLE 1

| f1 | 7.347 |
| f2 | 3.972 |
| f3 | −4.675 |
| f4 | 44.706 |
| f5 | −50.273 |
| f6 | −14.030 |
| f | 4.294 |

In this example, respective characteristics, such as radii of curvature, thicknesses of lenses or distances between the lenses, refractive indices, and Abbe numbers, of lenses are illustrated in FIG. 4.

In the first embodiment, the first lens 110 has positive refractive power and has a meniscus shape of which an object-side surface is convex. For example, a first surface of the first lens 110 is convex, and a second surface of the first lens 110 is concave. For example, a first surface of the first lens 110 is convex in the paraxial region, and a second surface of the first lens 110 is concave in the paraxial region.

The second lens 120 has a positive refractive power, and both the first and second surfaces thereof are convex. In one example, the first and second surfaces of the second lens are convex in the paraxial region.

The third lens 130 has a negative refractive power and has a meniscus shape of which an object-side surface is convex. For example, a first surface of the third lens 130 is convex, and a second surface of the third lens 130 is concave. For example, a first surface of the third lens 130 is convex in the paraxial region, and a second surface of the third lens 130 is concave in the paraxial region.

The fourth lens 140 has a positive refractive power and has a meniscus shape of which an image-side surface is convex. For example, a first surface of the fourth lens 140 is concave, and a second surface of the fourth lens 140 is convex. For example, a first surface of the fourth lens 140 is concave in the paraxial region, and a second surface of the fourth lens 140 is convex in the paraxial region.

The fifth lens 150 has a negative refractive power and has a meniscus shape of which an object-side surface is convex. For example, a first surface of the fifth lens 150 is convex, and a second surface of the fifth lens 150 is concave. In addition, at least one inflection point is formed on at least one of the first and second surfaces of the fifth lens 150.

The sixth lens 160 has a negative refractive power and has a meniscus shape of which an object-side surface is convex. For example, a first surface of the sixth lens 160 is convex, and a second surface of the sixth lens 160 is concave. In addition, at least one inflection point is formed on at least one of the first and second surfaces of the sixth lens 160. For instance, a first surface of the sixth lens 160 is convex in the paraxial region, and a second surface of the sixth lens is concave in the paraxial region.

Further, the respective surfaces of the first to sixth lenses 110 to 160 have aspherical surface coefficients as illustrated in FIG. 5. That is, each of the first surface of the first lens 110 to the second surface of the sixth lens 160 is aspherical. However, persons skilled in the art will appreciate that some variation in the aspherical surface coefficients may exist without departing from the results and benefits of the present third embodiment.

In one example, the stop is positioned between the object-side surface of the first lens 110 and an object-side surface of the fourth lens 140.

Figure 2:
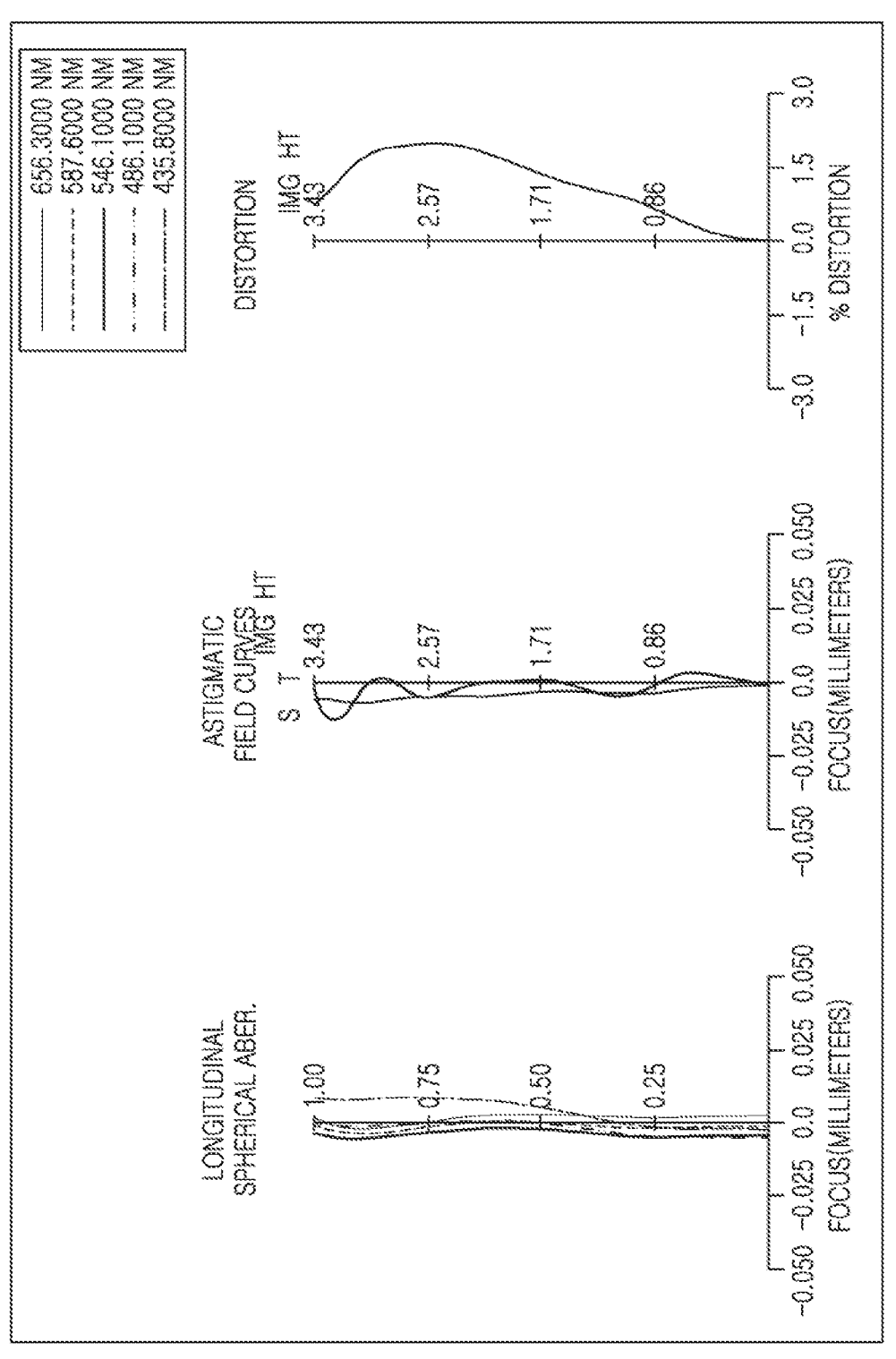
FIGS. 2 and 3 are graphs having curves representing aberration characteristics of the optical system illustrated in FIG. 1.
Figure 3:
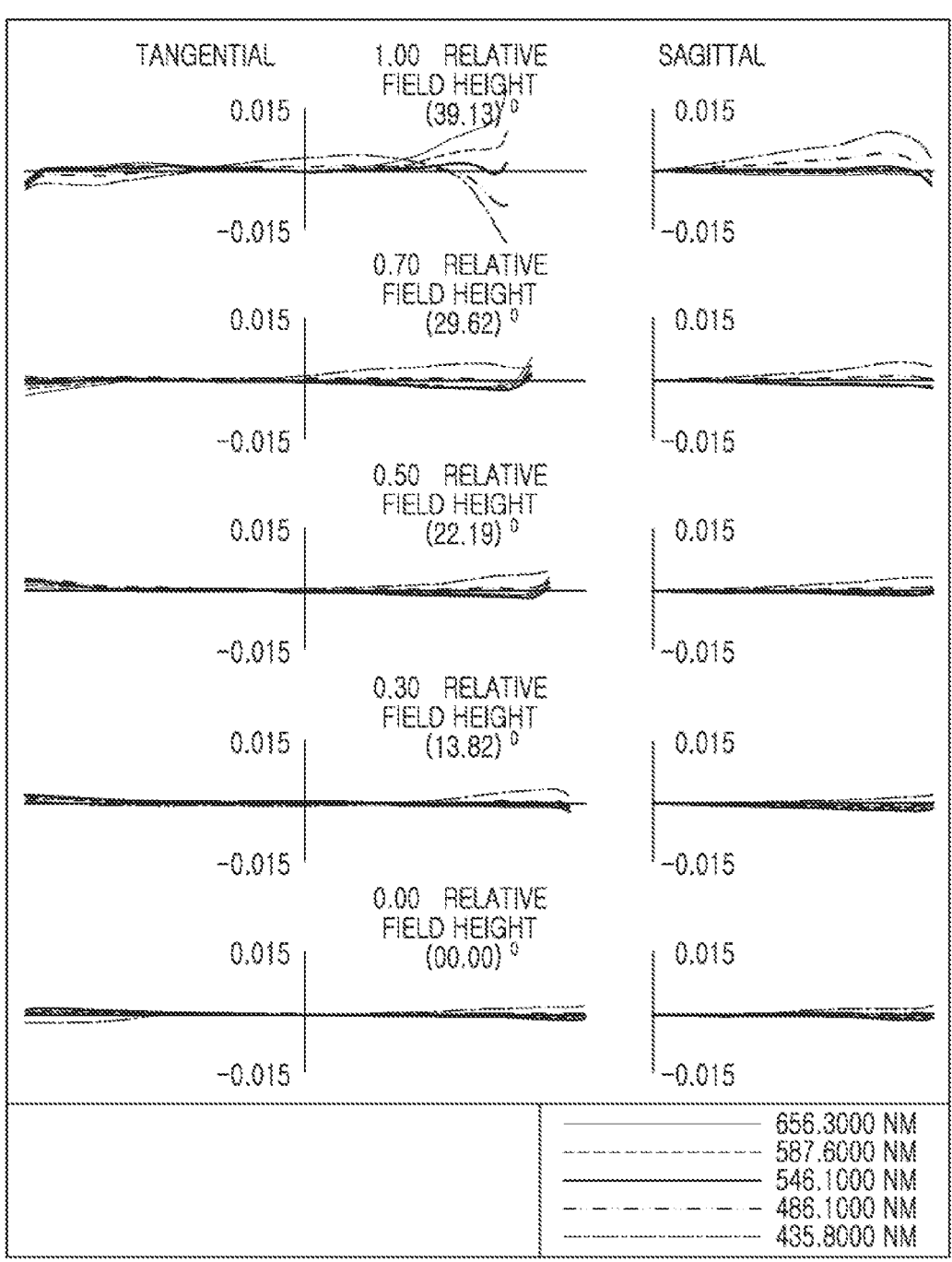
Figure 6:
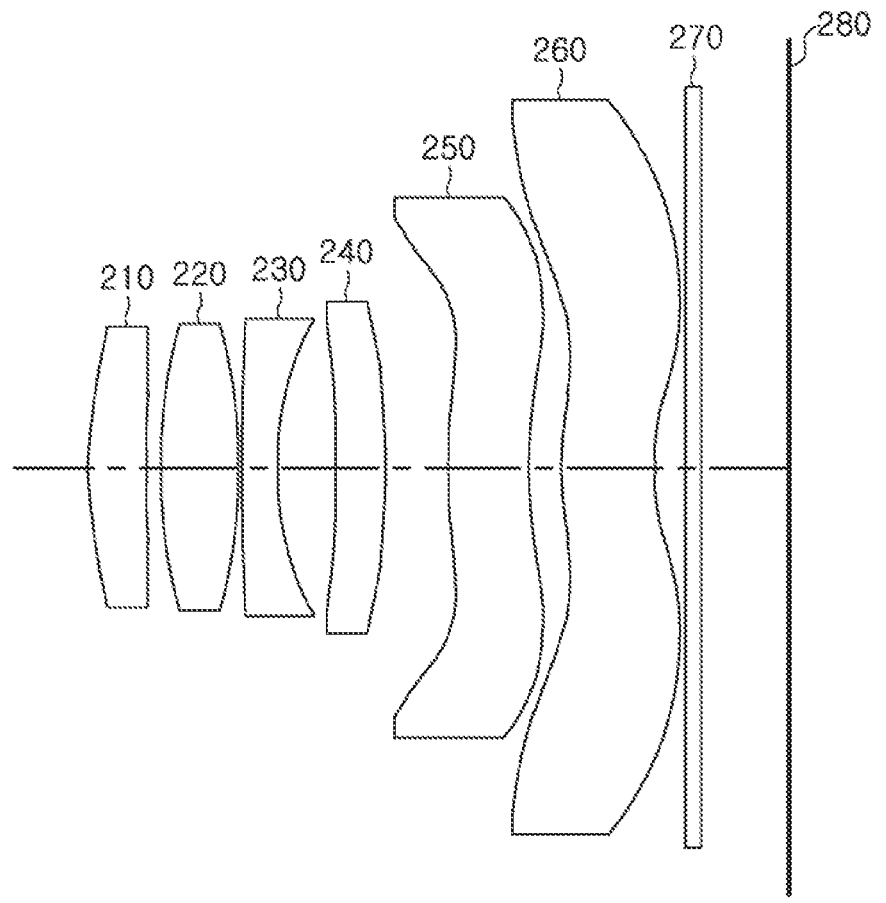
FIG. 6 is a view of an optical system, according to a second embodiment.

In addition, the optical system configured as described above include aberration characteristics illustrated in FIGS. 2 and 3. However, persons skilled in the art will appreciate that some variation in the aberration characteristics may exist without departing from the results and benefits of the first embodiment.

An optical system, according to a second embodiment, will be described with reference to FIGS. 6 through 10.

The optical system, according to the second embodiment, includes a first lens 210, a second lens 220, a third lens 230, a fourth lens 240, a fifth lens 250, and a sixth lens 260. The optical system may also include a stop (not shown), an infrared cut-off filter 270, and an image sensor 280.

As illustrated in Table 2, a focal length (f1) of the first lens 210 may be 7.733 mm, a focal length (f2) of the second lens 220 is 3.992 mm, a focal length (f3) of the third lens 230 is −4.954 mm, a focal length (f4) of the fourth lens 240 is 39.276 mm, a focal length (f5) of the fifth lens 250 is −50.253 mm, a focal length (f6) of the sixth lens 260 is −14.937 mm, and an overall focal length (f) of the optical system is 4.178 mm.

TABLE 2

| | |
|---|---|
| f1 | 7.733 |
| f2 | 3.992 |
| f3 | −4.954 |
| f4 | 39.276 |
| f5 | −50.253 |
| f6 | −14.937 |
| f | 4.178 |

12

In this example, respective characteristics, such as radii of curvature, thicknesses of lenses or distances between the lenses, refractive indices, and Abbe numbers, of lenses are illustrated in FIG. 9.

In the second embodiment, the first lens 210 has a positive refractive power and has a meniscus shape of which an object-side surface is convex. For example, a first surface of the first lens 210 is convex, and a second surface of the first lens 210 is concave.

The second lens 220 has a positive refractive power, and both the first and second surfaces thereof are convex.

The third lens 230 has a negative refractive power and has a meniscus shape of which an object-side surface is convex. For example, a first surface of the third lens 230 is convex, and a second surface of the third lens 230 is concave.

The fourth lens 240 has a positive refractive power and has a meniscus shape of which an image-side surface is convex. For example, a first surface of the fourth lens 240 is concave, and a second surface of the fourth lens 240 is convex.

The fifth lens 250 has a negative refractive power and has a meniscus shape of which an object-side surface is convex. For example, a first surface of the fifth lens 250 is convex, and a second surface of the fifth lens 250 is concave. In addition, at least one inflection point is formed on at least one of the first and second surfaces of the fifth lens 250.

The sixth lens 260 has a negative refractive power and has a meniscus shape of which an object-side surface is convex. For example, a first surface of the sixth lens 260 is convex, and a second surface of the sixth lens 260 is concave. In addition, at least one inflection point is formed on at least one of the first and second surfaces of the sixth lens 260. For instance, a first surface of the sixth lens 260 is convex in the paraxial region, and a second surface of the sixth lens is concave in the paraxial region.

In accordance with an example, the respective surfaces of the first to sixth lenses 210 to 260 have aspherical surface coefficients as illustrated in FIG. 10. That is, each of the first surface of the first lens 210 to the second surface of the sixth lens 260 is aspherical. However, persons skilled in the art will appreciate that some variation in the aspherical surface coefficients may exist without departing from the results and benefits of the present second embodiment.

In addition, the stop is disposed between the object-side surface of the first lens 210 and an object-side surface of the fourth lens 240.

Figure 7:
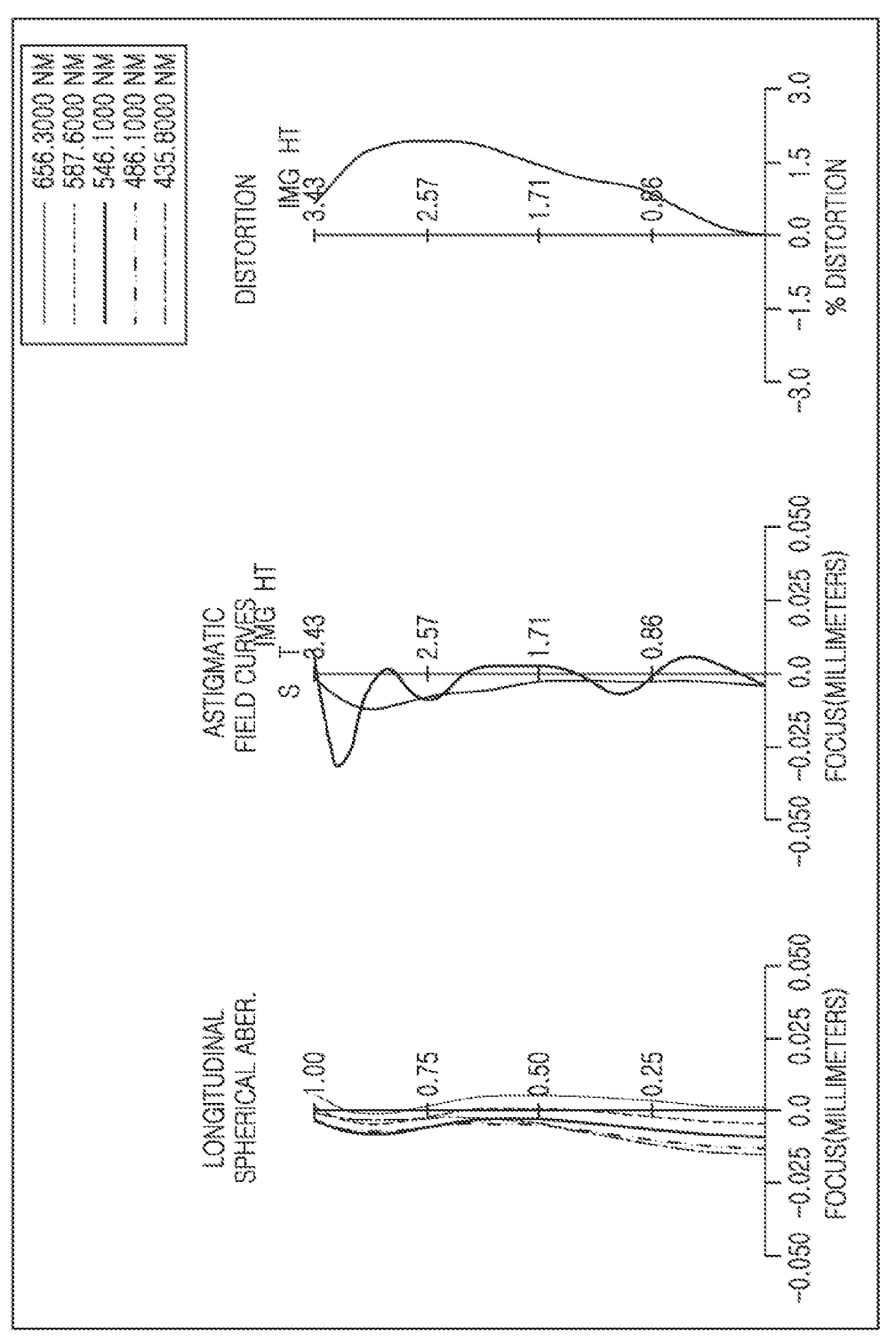
FIGS. 7 and 8 are graphs having curves representing aberration characteristics of the optical system illustrated in FIG. 6.
Figure 8:
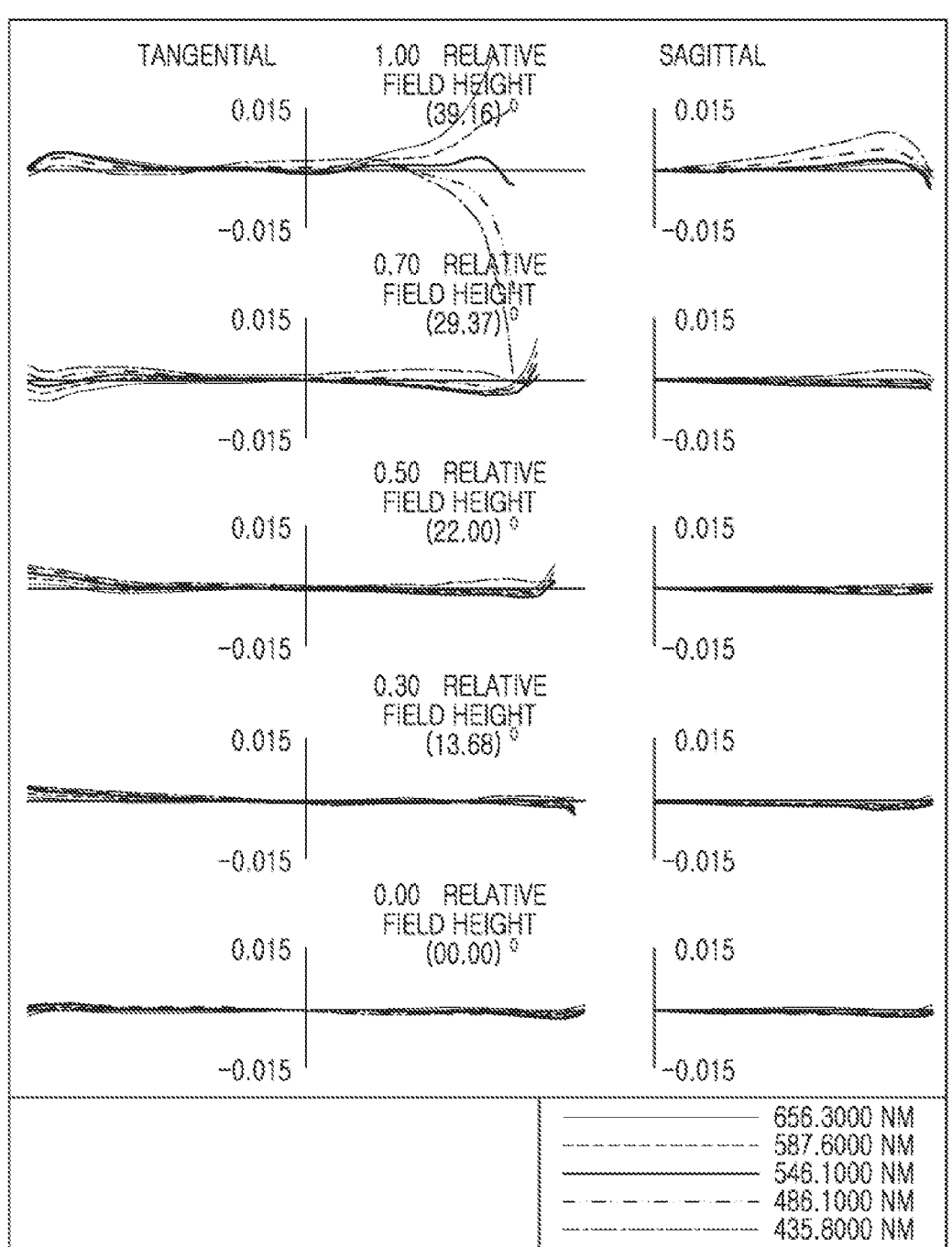
Figure 11:
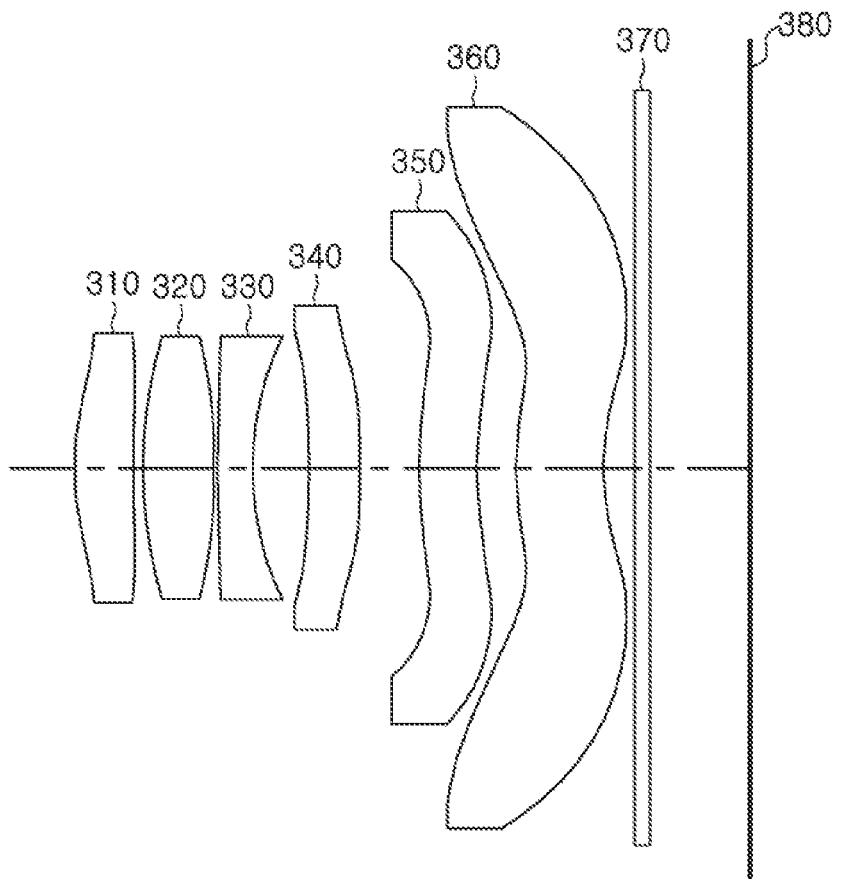
FIG. 11 is a view of an optical system, according to a third embodiment.

In addition, the optical system, configured as described above, has aberration characteristics illustrated in FIGS. 7 and 8. However, persons skilled in the art will appreciate that some variation in the aberration characteristics may exist without departing from the results and benefits of the present second embodiment.

An optical system, according to a third embodiment, will be described with reference to FIGS. 11 through 15.

The optical system, according to the third embodiment, includes a first lens 310, a second lens 320, a third lens 330, a fourth lens 340, a fifth lens 350, and a sixth lens 360. The optical system also includes a stop, an infrared cut-off filter 370, and an image sensor 380.

As illustrated in Table 3, a focal length (f1) of the first lens 310 is 7.868 mm, a focal length (f2) of the second lens 320 is 3.810 mm, a focal length (f3) of the third lens 330 is −5.002 mm, a focal length (f4) of the fourth lens 340 is 40.533 mm, a focal length (f5) of the fifth lens 350 is −50.247 mm, a focal length (f6) of the sixth lens 360 is −15.237 mm, and an overall focal length (f) of the optical system is 4.111 mm.

TABLE 3

| f1 | 7.868 |
|----|-------|
| f2 | 3.810 |
| f3 | -5.002 |
| f4 | 40.533 |
| f5 | -50.247 |
| f6 | -15.237 |
| f | 4.111 |

In this example, respective characteristics, such as radii of curvature, thicknesses of lenses or distances between the lenses, refractive indices, and Abbe numbers, of lenses are illustrated in FIG. 14.

In the third embodiment, the first lens 310 has a positive refractive power and has a meniscus shape of which an object-side surface is convex. For example, a first surface of the first lens 310 is convex, and a second surface of the first lens 310 is concave.

The second lens 320 has a positive refractive power, and both the first and second surfaces thereof are convex. The third lens 330 has a negative refractive power and has a meniscus shape of which an object-side surface is convex. For example, a first surface of the third lens 330 is convex, and a second surface of the third lens 330 is concave.

The fourth lens 340 has a positive refractive power and has a meniscus shape of which an image-side surface is convex. For example, a first surface of the fourth lens 340 is concave, and a second surface of the fourth lens 340 is convex.

The fifth lens 350 has a negative refractive power and has a meniscus shape of which an object-side surface is convex. For example, a first surface of the fifth lens 350 is convex, and a second surface of the fifth lens 350 is concave. In addition, at least one inflection point is formed on at least one of the first and second surfaces of the fifth lens 350.

The sixth lens 360 has a negative refractive power and has a meniscus shape of which an object-side surface is convex. For example, a first surface of the sixth lens 360 is convex, and a second surface of the sixth lens 360 is concave. In addition, at least one inflection point is formed on at least one of the first and second surfaces of the sixth lens 360. For instance, a first surface of the sixth lens 360 is convex in the paraxial region, and a second surface of the sixth lens is concave in the paraxial region.

Furthermore, the respective surfaces of the first to sixth lenses 310 to 360 have aspherical surface coefficients as illustrated in FIG. 15. That is, each of the first surface of the first lens 310 to the second surface of the sixth lens 360 is aspherical. However, persons skilled in the art will appreciate that some variation in the aspherical surface coefficients may exist without departing from the results and benefits of the third embodiment.

In addition, the stop is disposed between the object-side surface of the first lens 310 and an object-side surface of the fourth lens 340.

Figure 12:
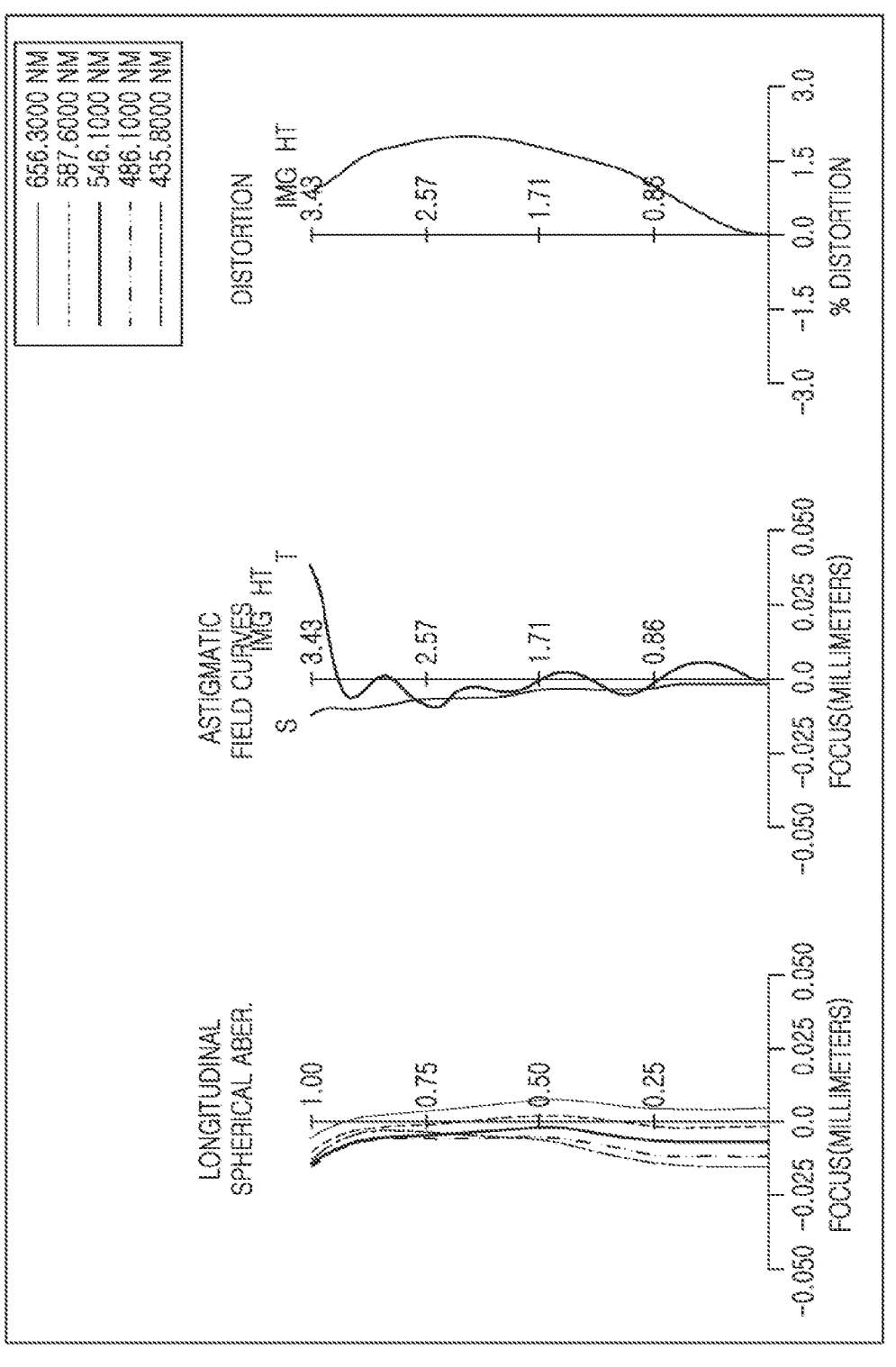
FIGS. 12 and 13 are graphs having curves representing aberration characteristics of the optical system illustrated in FIG. 11.
Figure 13:
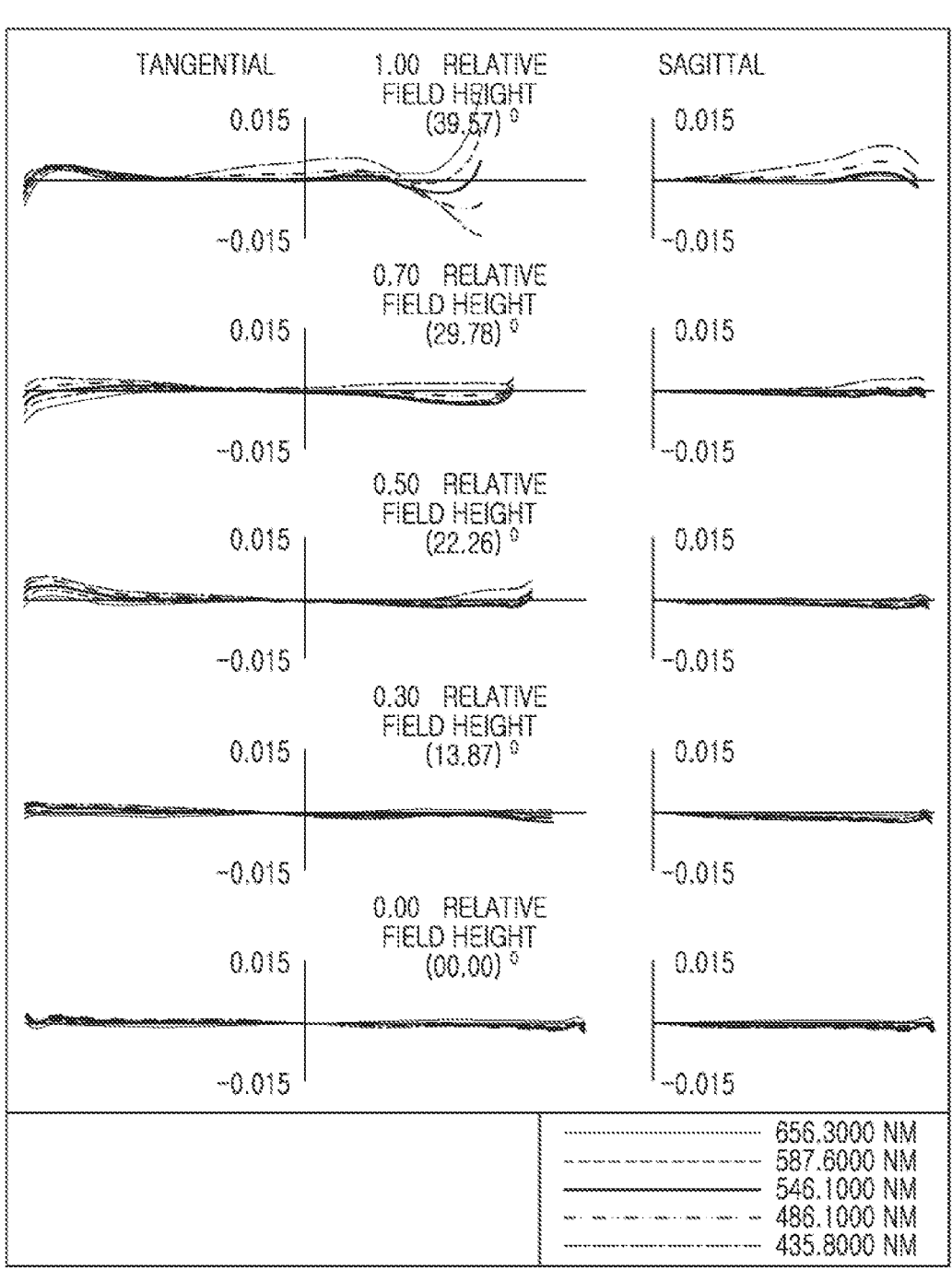
Figure 16:
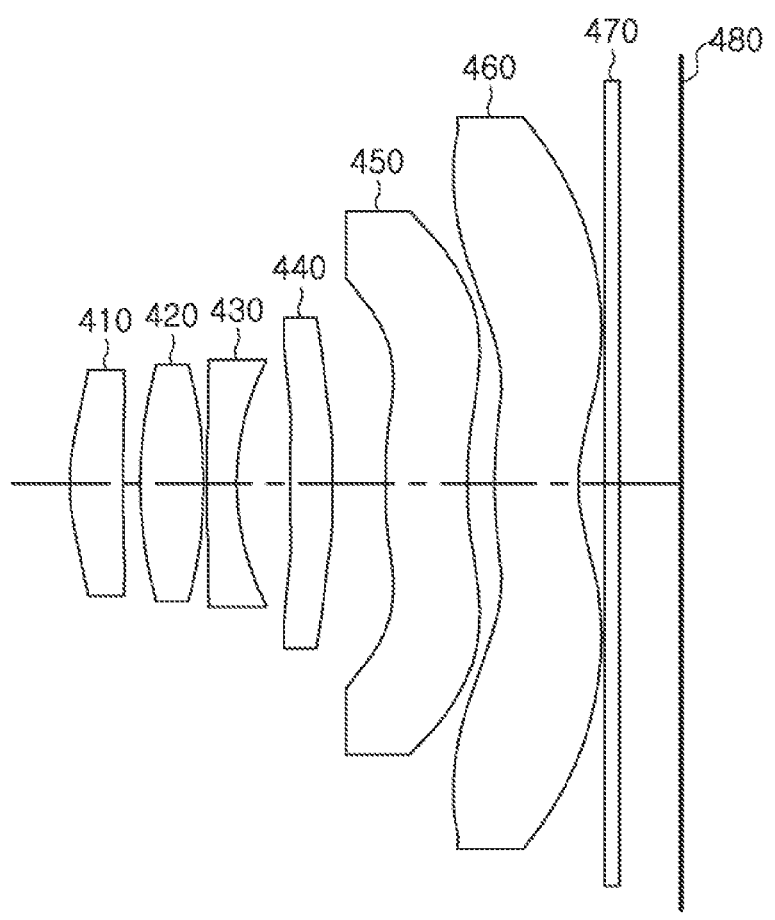
FIG. 16 is a view of an optical system, according to a fourth embodiment.

In addition, the optical system configured as described above has aberration characteristics illustrated in FIGS. 12 and 13. However, persons skilled in the art will appreciate that some variation in the aberration characteristics may exist without departing from the results and benefits of the third embodiment.

An optical system, according to a fourth embodiment, will be described with reference to FIGS. 16 through 20.

The optical system, according to the fourth embodiment, includes a first lens 410, a second lens 420, a third lens 430, a fourth lens 440, a fifth lens 450, and a sixth lens 460. The optical system may also include a stop, an infrared cut-off filter 470, and an image sensor 480.

As illustrated in Table 4, a focal length (f1) of the first lens 410 may be 7.790 mm, a focal length (f2) of the second lens 420 is 3.846 mm, a focal length (f3) of the third lens 430 is -4.530 mm, a focal length (f4) of the fourth lens 440 is 36.491 mm, a focal length (f5) of the fifth lens 450 is -50.265 mm, a focal length (f6) of the sixth lens 460 is -12.199 mm, and an overall focal length (f) of the optical system is 4.330 mm.

TABLE 4

| f1 | 7.790 |
|----|-------|
| f2 | 3.846 |
| f3 | -4.530 |
| f4 | 36.491 |
| f5 | -50.265 |
| f6 | -12.199 |
| f | 4.330 |

In this example, respective characteristics, such as radii of curvature, thicknesses of lenses or distances between the lenses, refractive indices, and Abbe numbers, of lenses are illustrated in FIG. 19.

In the fourth embodiment, the first lens 410 has a positive refractive power and has a meniscus shape of which an object-side surface is convex. For example, a first surface of the first lens 410 is convex, and a second surface of the first lens 410 is concave.

The second lens 420 has a positive refractive power, and both the first and second surfaces thereof are convex. The third lens 430 has a negative refractive power and has a meniscus shape of which an object-side surface is convex. For example, a first surface of the third lens 430 is convex, and a second surface of the third lens 430 is concave.

The fourth lens 440 has a positive refractive power, and both the first and second surfaces thereof are convex. The fifth lens 450 has a negative refractive power and have a meniscus shape of which an object-side surface is convex. For example, a first surface of the fifth lens 450 is convex, and a second surface of the fifth lens 450 is concave. In addition, at least one inflection point is formed on at least one of the first and second surfaces of the fifth lens 450.

The sixth lens 460 has a negative refractive power and have a meniscus shape of which an object-side surface is convex. For example, a first surface of the sixth lens 460 is convex, and a second surface of the sixth lens 460 is concave. In addition, at least one inflection point is formed on at least one of the first and second surfaces of the sixth lens 460. For instance, a first surface of the sixth lens 460 is convex in the paraxial region, and a second surface of the sixth lens is concave in the paraxial region.

Furthermore, the respective surfaces of the first to sixth lenses 410 to 460 have aspherical surface coefficients as illustrated in FIG. 20. That is, each of the first surface of the first lens 410 to the second surface of the sixth lens 460 is aspherical. However, persons skilled in the art will appreciate that some variation in the aspherical surface coefficients may exist without departing from the results and benefits of the present fourth embodiment.

In addition, the stop is disposed between the object-side surface of the first lens 410 and an object-side surface of the fourth lens 440.

Figure 17:
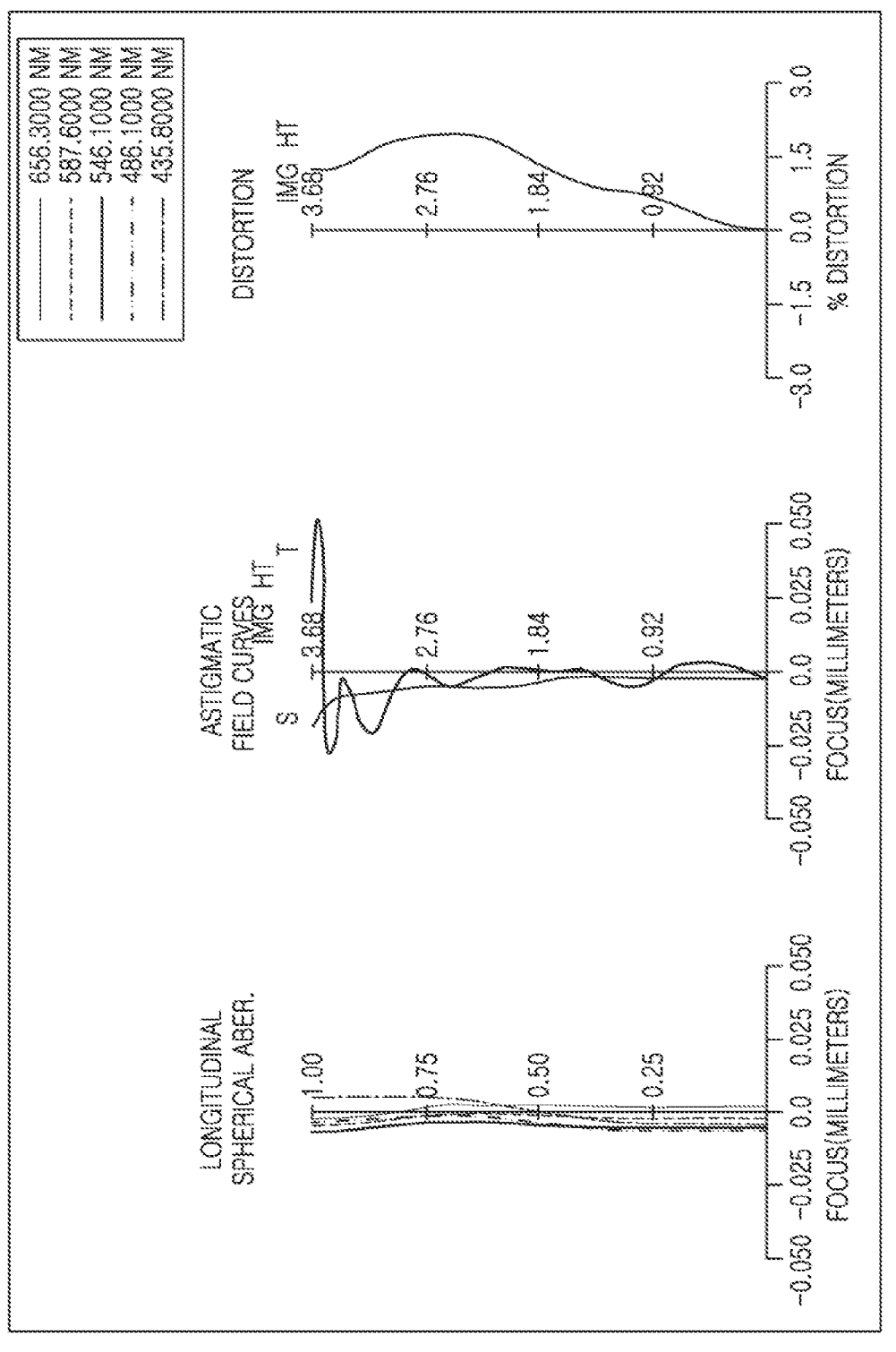
FIGS. 17 and 18 are graphs having curves representing aberration characteristics of the optical system illustrated in FIG. 16.
Figure 18:
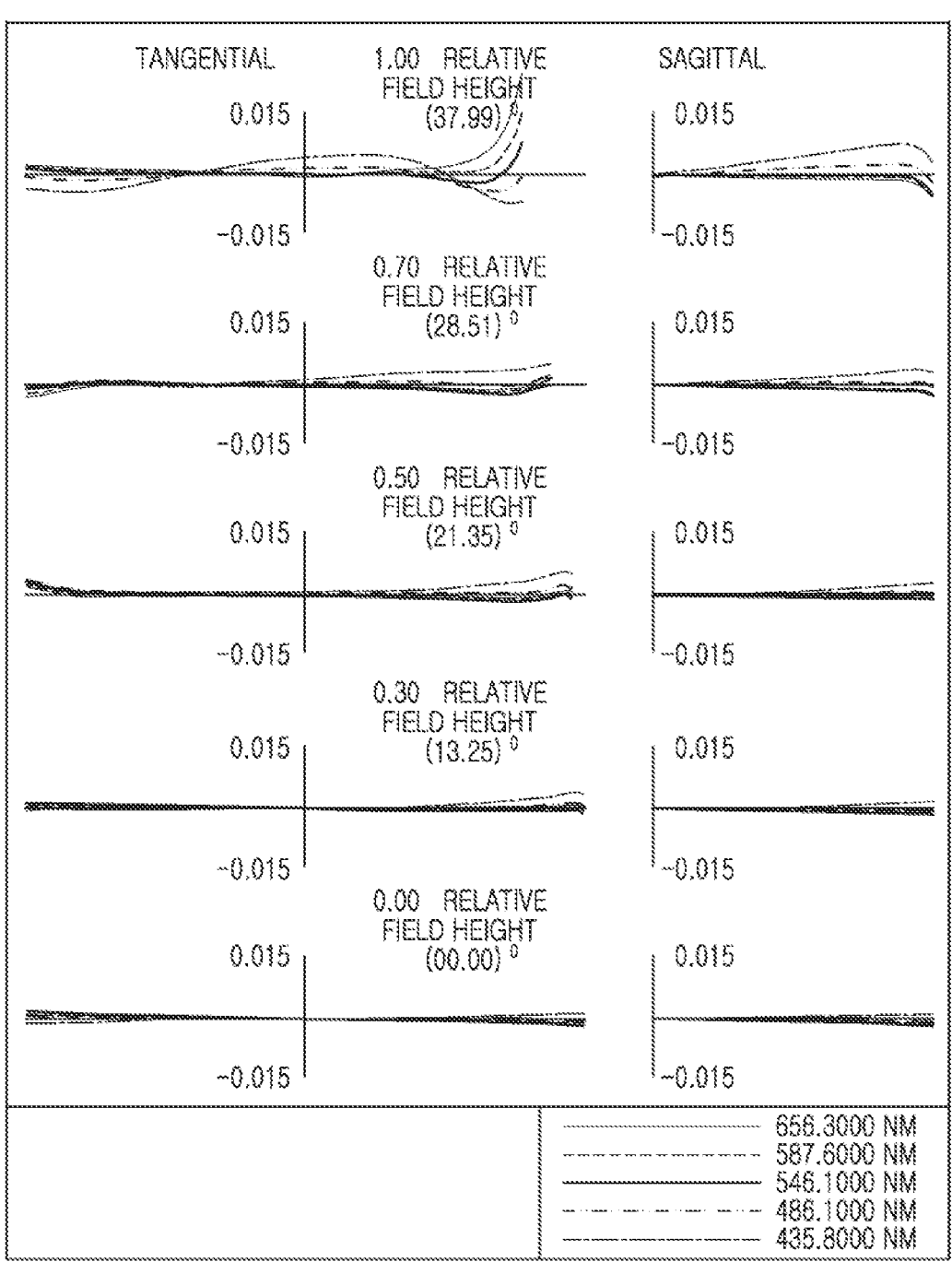
Figure 21:
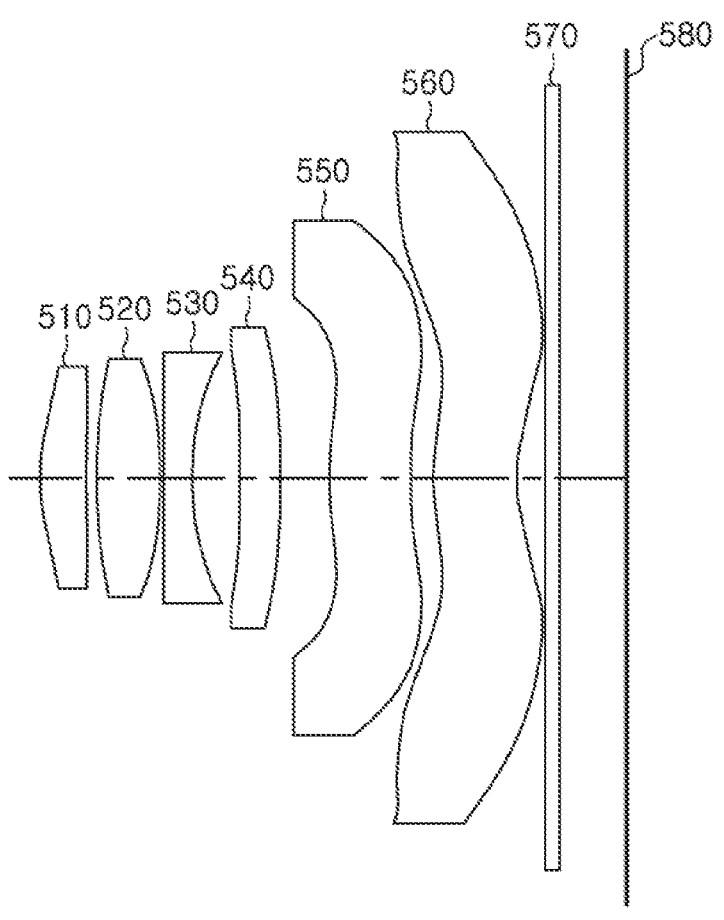
FIG. 21 is a view of an optical system, according to a fifth embodiment.

In addition, the optical system configured as described above has aberration characteristics illustrated in FIGS. 17 and 18. However, persons skilled in the art will appreciate that some variation in the aberration characteristics may exist without departing from the results and benefits of the present fourth embodiment.

An optical system, according to a fifth embodiment, will be described with reference to FIGS. 21 through 25.

The optical system, according to the fifth embodiment, includes a first lens 510, a second lens 520, a third lens 530, a fourth lens 540, a fifth lens 550, and a sixth lens 560. The optical system also includes a stop, an infrared cut-off filter 570, and an image sensor 580.

As illustrated in Table 5, a focal length (f1) of the first lens 510 is 6.931 mm, a focal length (f2) of the second lens 520 is 3.888 mm, a focal length (f3) of the third lens 530 is −4.598 mm, a focal length (f4) of the fourth lens 540 is 80.306 mm, a focal length (f5) of the fifth lens 550 is −50.263 mm, a focal length (f6) of the sixth lens 560 is −16.646 mm, and an overall focal length (f) of the optical system is 4.140 mm.

TABLE 5

| f1 | 6.931 |
|---|---|
| f2 | 3.888 |
| f3 | −4.598 |
| f4 | 80.306 |
| f5 | −50.263 |
| f6 | −16.646 |
| f | 4.140 |

In one illustrative example, respective characteristics, such as radii of curvature, thicknesses of lenses or distances between the lenses, refractive indices, and Abbe numbers, of lenses are illustrated in FIG. 24.

In the fifth embodiment, the first lens 510 has a positive refractive power and has a meniscus shape of which an object-side surface is convex. For example, a first surface of the first lens 510 is convex, and a second surface of the first lens 510 is concave.

The second lens 520 has a positive refractive power, and both the first and second surfaces thereof are convex. The third lens 530 has a negative refractive power and has a meniscus shape of which an object-side surface is convex. For example, a first surface of the third lens 530 is convex, and a second surface of the third lens 530 is concave.

The fourth lens 540 has a positive refractive power and has a meniscus shape of which an image-side surface is convex. For example, a first surface of the fourth lens 540 is concave, and a second surface of the fourth lens 540 is convex.

The fifth lens 550 has a negative refractive power and has a meniscus shape of which an object-side surface is convex. For example, a first surface of the fifth lens 550 is convex, and a second surface of the fifth lens 550 is concave. In addition, at least one inflection point is formed on at least one of the first and second surfaces of the fifth lens 550.

The sixth lens 560 has a negative refractive power and have a meniscus shape of which an object-side surface is convex. For example, a first surface of the sixth lens 560 is convex, and a second surface of the sixth lens 560 is concave. In addition, at least one inflection point is formed on at least one of the first and second surfaces of the sixth lens 560. For instance, a first surface of the sixth lens 560 is convex in the paraxial region, and a second surface of the sixth lens is concave in the paraxial region.

Furthermore, the respective surfaces of the first to sixth lenses 510 to 560 have aspherical surface coefficients as illustrated in FIG. 25. That is, each of the first surface of the first lens 510 to the second surface of the sixth lens 560 is aspherical. However, persons skilled in the art will appreciate that some variation in the aspherical surface coefficients may exist without departing from the results and benefits of the present fifth embodiment.

In addition, the stop is disposed between the object-side surface of the first lens 510 and an object-side surface of the fourth lens 540.

Figure 22:
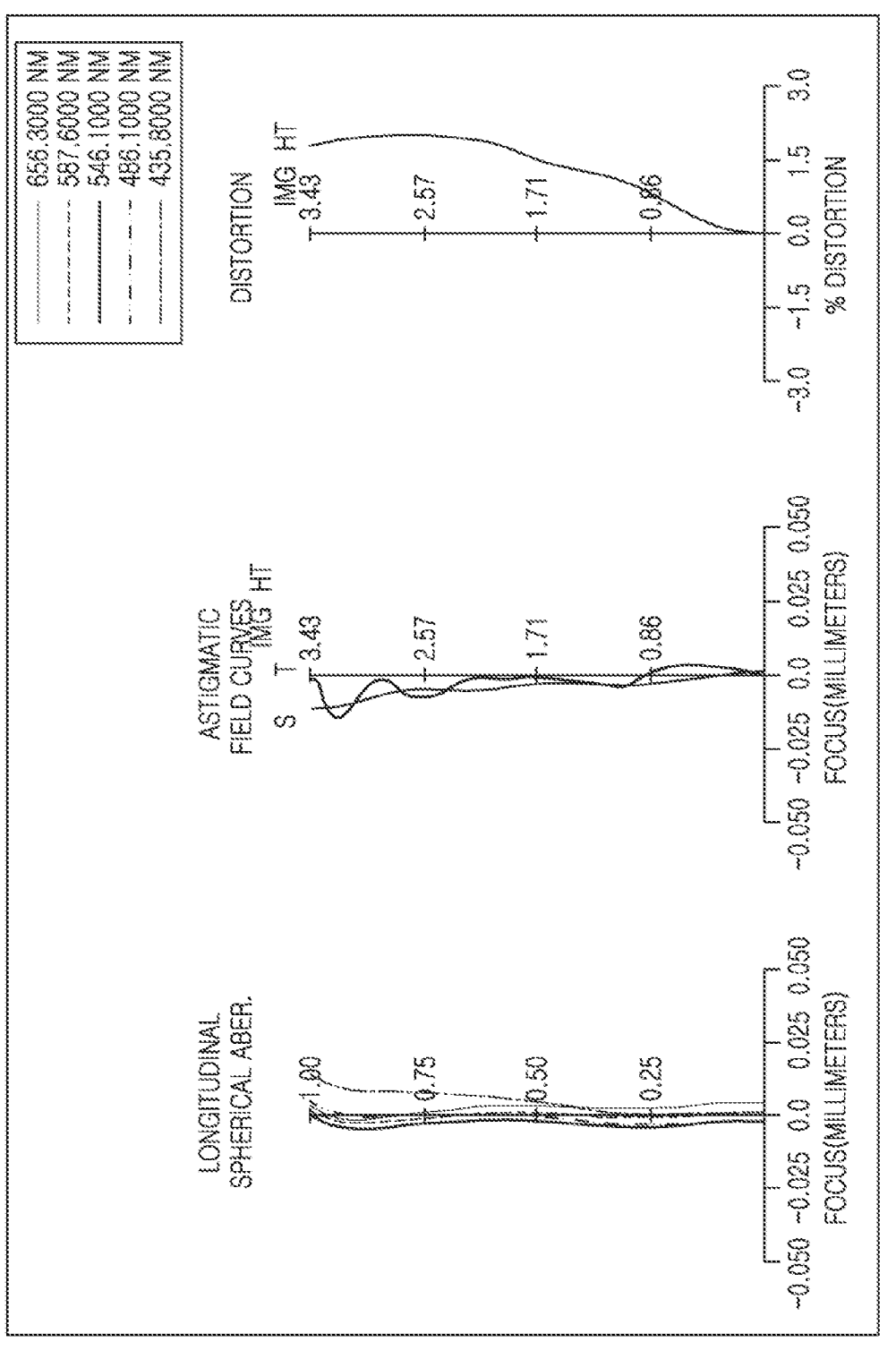
FIGS. 22 and 23 are graphs having curves representing aberration characteristics of the optical system illustrated in FIG. 21.
Figure 23:
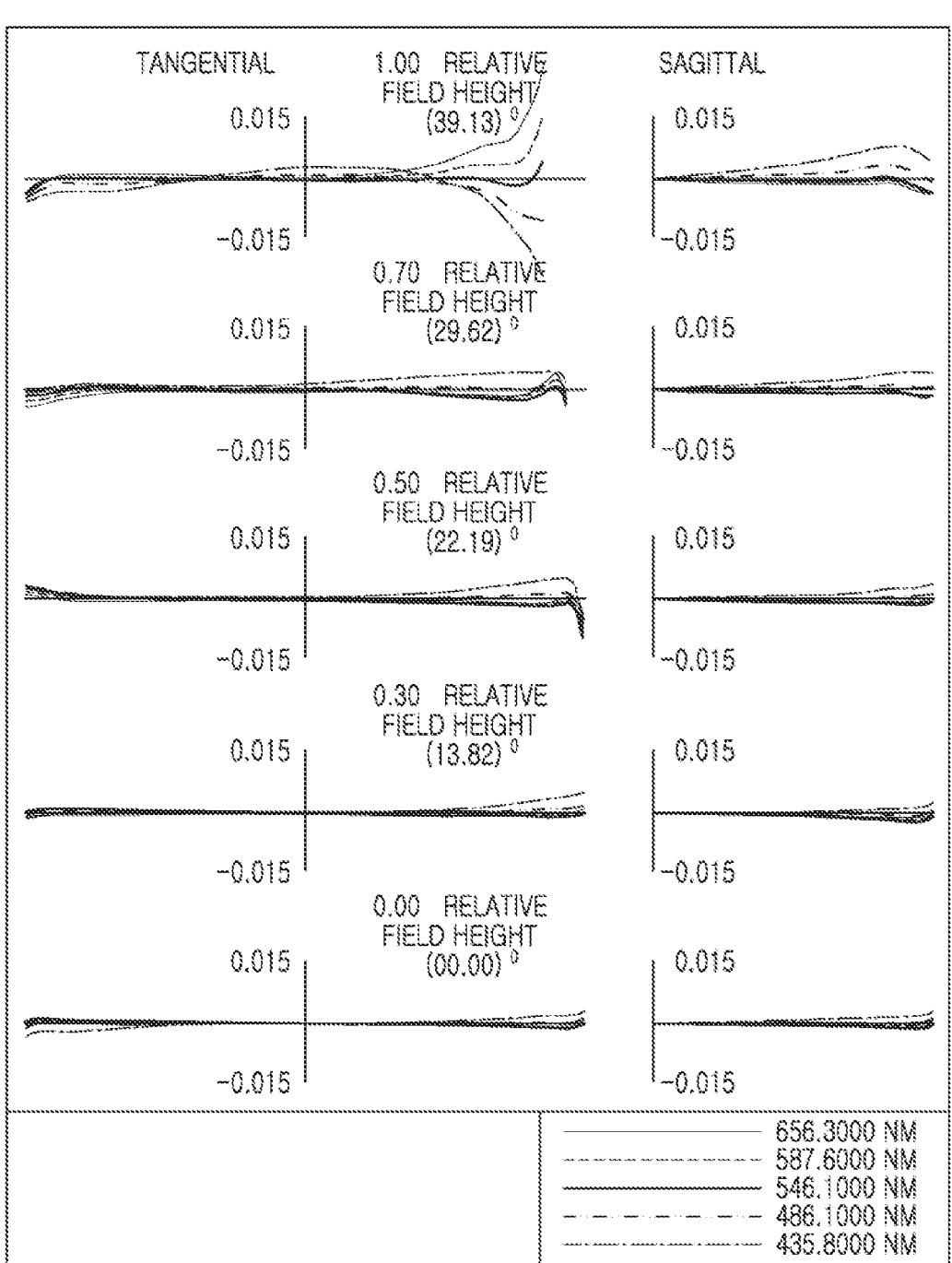
Figure 26:
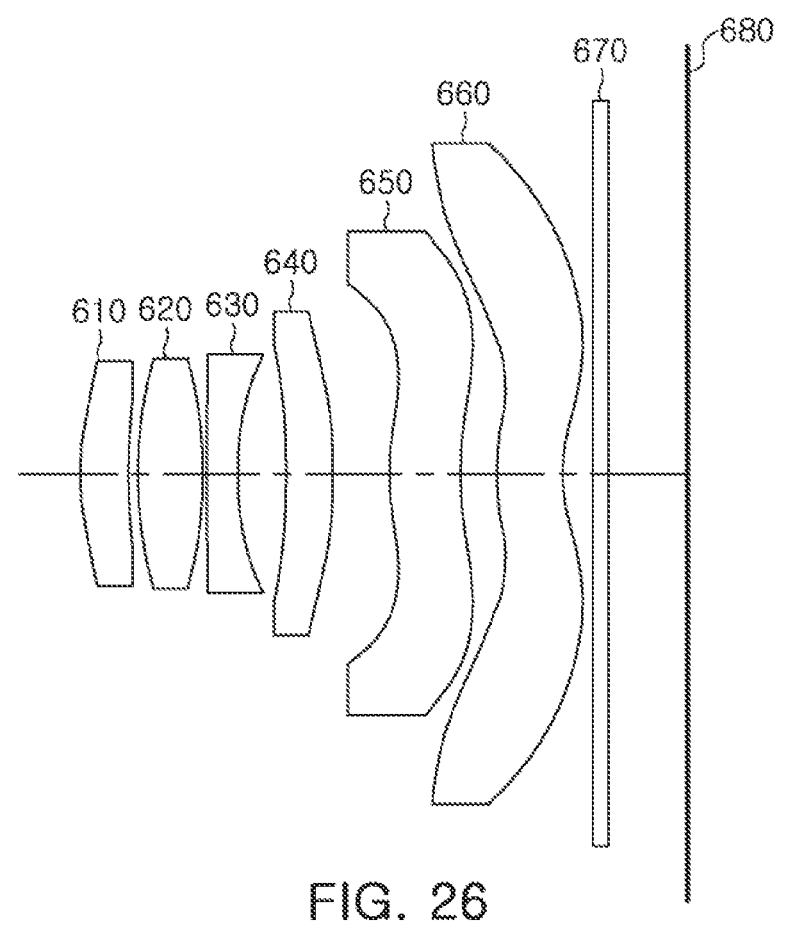
FIG. 26 is a view of an optical system, according to a sixth embodiment.

In addition, the optical system configured as described above has aberration characteristics illustrated in FIGS. 22 and 23. However, persons skilled in the art will appreciate that some variation in the aberration characteristics may exist without departing from the results and benefits of the present third embodiment.

An optical system, according to a sixth embodiment, will be described with reference to FIGS. 26 through 30.

The optical system, according to the sixth embodiment, includes a first lens 610, a second lens 620, a third lens 630, a fourth lens 640, a fifth lens 650, and a sixth lens 660. The optical system may also include a stop, an infrared cut-off filter 670, and an image sensor 680.

As illustrated in Table 6, a focal length (f1) of the first lens 610 is 8.789 mm, a focal length (f2) of the second lens 620 is 3.473 mm, a focal length (f3) of the third lens 630 is −4.782 mm, a focal length (f4) of the fourth lens 640 is 47.029 mm, a focal length (f5) of the fifth lens 650 is −50.194 mm, a focal length (f6) of the sixth lens 660 is −12.665 mm, and an overall focal length (f) of the optical system is 4.100 mm.

TABLE 6

| f1 | 8.789 |
|---|---|
| f2 | 3.473 |
| f3 | −4.782 |
| f4 | 47.029 |
| f5 | −50.194 |
| f6 | −12.665 |
| f | 4.100 |

In this example, respective characteristics, such as radii of curvature, thicknesses of lenses or distances between the lenses, refractive indices, and Abbe numbers, of lenses are illustrated in FIG. 29.

In the sixth embodiment, the first lens 610 has positive refractive power and have a meniscus shape of which an object-side surface is convex. For example, a first surface of the first lens 610 is convex, and a second surface of the first lens 610 is concave.

The second lens 620 has a positive refractive power, and both, the first and second surfaces thereof, are convex. The third lens 630 has a negative refractive power and has a meniscus shape of which an object-side surface is convex. For example, a first surface of the third lens 630 is convex, and a second surface of the third lens 630 is concave.

The fourth lens 640 has a positive refractive power and has a meniscus shape of which an image-side surface is convex. For example, a first surface of the fourth lens 640 is concave, and a second surface of the fourth lens 640 is convex.

The fifth lens 650 has a negative refractive power and has a meniscus shape of which an object-side surface is convex. For example, a first surface of the fifth lens 650 is convex, and a second surface of the fifth lens 650 is concave. In addition, at least one inflection point is formed on at least one of the first and second surfaces of the fifth lens 650.

The sixth lens 660 has a negative refractive power and has a meniscus shape of which an object-side surface is convex. For example, a first surface of the sixth lens 660 is convex, and a second surface of the sixth lens 660 is concave. In addition, at least one inflection point is formed on at least one of the first and second surfaces of the sixth lens 660. For instance, a first surface of the sixth lens 660 is convex in the paraxial region, and a second surface of the sixth lens is concave in the paraxial region.

In addition, the respective surfaces of the first to sixth lenses 610 to 660 have aspherical surface coefficients as illustrated in FIG. 30. That is, each of the first surface of the first lens 610 to the second surface of the sixth lens 660 is aspherical. However, persons skilled in the art will appreciate that some variation in the aspherical surface coefficients may exist without departing from the results and benefits of the present third embodiment.

In addition, the stop is disposed between the object-side surface of the first lens 610 and an object-side surface of the fourth lens 640.

Figure 27:
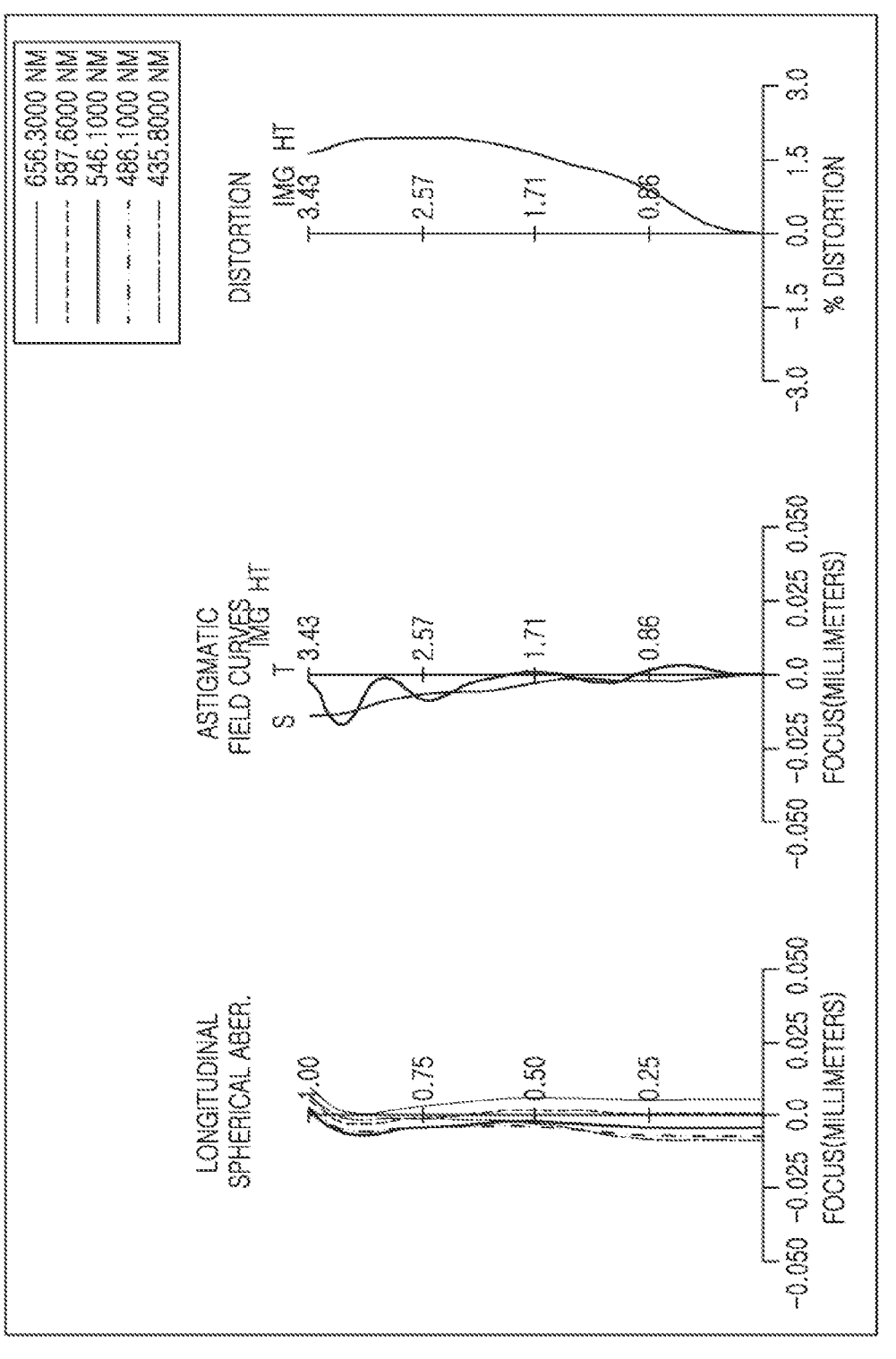
FIGS. 27 and 28 are graphs having curves representing aberration characteristics of the optical system illustrated in FIG. 26.
Figure 28:
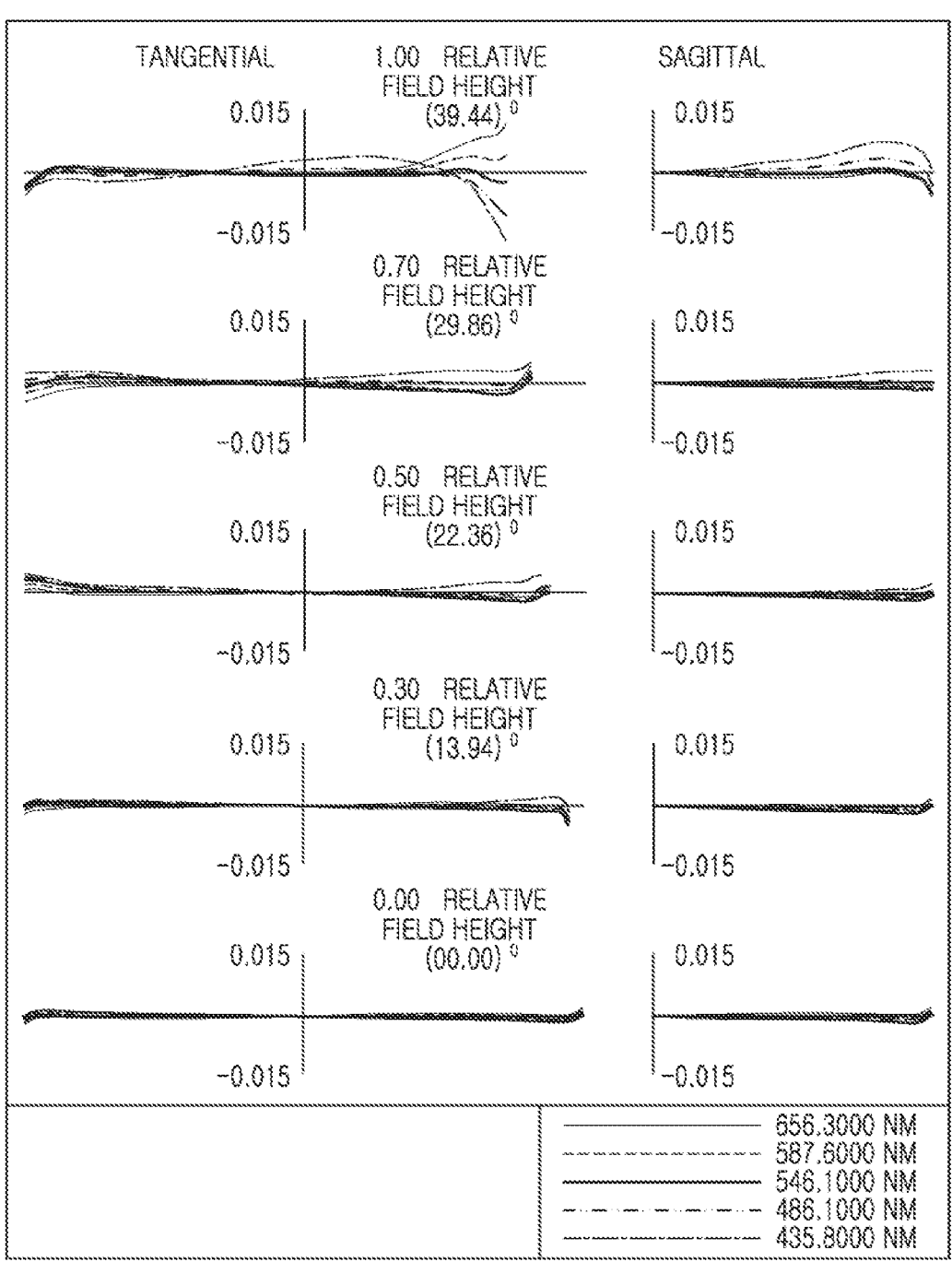
Figure 31:
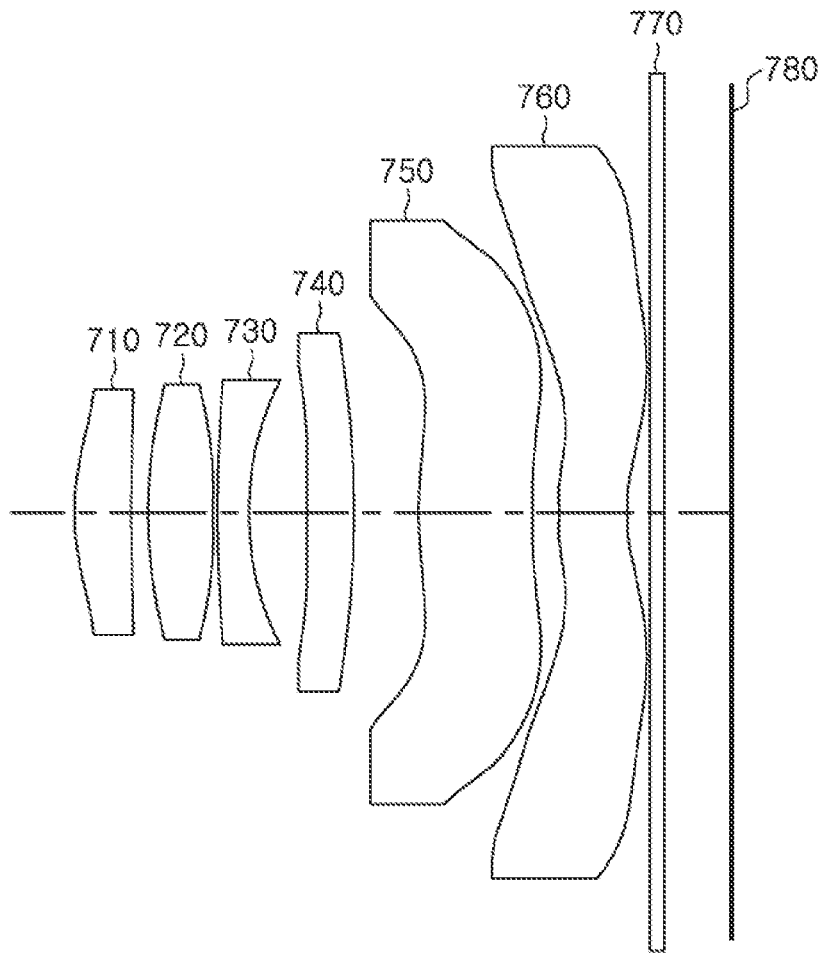
FIG. 31 is a view of an optical system, according to a seventh embodiment.

In addition, the optical system configured as described above has aberration characteristics illustrated in FIGS. 27 and 28. However, persons skilled in the art will appreciate that some variation in the aberration characteristics may exist without departing from the results and benefits of the present third embodiment.

An optical system, according to a seventh embodiment, will be described with reference to FIGS. 31 through 35.

The optical system, according to the seventh embodiment, includes a first lens 710, a second lens 720, a third lens 730, a fourth lens 740, a fifth lens 750, and a sixth lens 760. The optical system also includes a stop, an infrared cut-off filter 770, and an image sensor 780.

As illustrated in Table 7, a focal length (f1) of the first lens 710 is 7.347 mm, a focal length (f2) of the second lens 720 is 4.216 mm, a focal length (f3) of the third lens 730 is −5.194 mm, a focal length (f4) of the fourth lens 740 is 69.337 mm, a focal length (f5) of the fifth lens 750 is −50.214 mm, a focal length (f6) of the sixth lens 760 is −9.453 mm, and an overall focal length (f) of the optical system is 4.420 mm.

TABLE 7

| | |
|---|---|
| f1 | 7.347 |
| f2 | 4.216 |
| f3 | −5.194 |
| f4 | 69.337 |
| f5 | −50.214 |
| f6 | −9.453 |
| f | 4.420 |

In this example, respective characteristics, such as radii of curvature, thicknesses of lenses or distances between the lenses, refractive indices, and Abbe numbers, of lenses are illustrated in FIG. 34.

In the seventh embodiment, the first lens 710 has a positive refractive power and has a meniscus shape of which an object-side surface is convex. For example, a first surface of the first lens 710 is convex, and a second surface of the first lens 710 is concave.

The second lens 720 has a positive refractive power, and the first and second surfaces thereof are convex.

The third lens 730 has a negative refractive power and has a meniscus shape of which an object-side surface is convex. For example, a first surface of the third lens 730 is convex, and a second surface of the third lens 730 is concave.

The fourth lens 740 has a positive refractive power, and the first and second surfaces thereof are convex. The fifth lens 750 has a negative refractive power and has a meniscus shape of which an object-side surface is convex. For example, a first surface of the fifth lens 750 is convex, and a second surface of the fifth lens 750 is concave. In addition, at least one inflection point is formed on at least one of the first and second surfaces of the fifth lens 750.

The sixth lens 760 has a negative refractive power and has a meniscus shape of which an object-side surface is convex. For example, a first surface of the sixth lens 760 is convex, and a second surface of the sixth lens 760 is concave. In addition, at least one inflection point is formed on at least one of the first and second surfaces of the sixth lens 760. For instance, a first surface of the sixth lens 760 is convex in the paraxial region, and a second surface of the sixth lens is concave in the paraxial region.

Further, the respective surfaces of the first to sixth lenses 710 to 760 have aspherical surface coefficients as illustrated in FIG. 35. That is, each of the first surface of the first lens 710 to the second surface of the sixth lens 760 is aspherical. However, persons skilled in the art will appreciate that some variation in the aspherical surface coefficients may exist without departing from the results and benefits of the present third embodiment.

In addition, the stop is disposed between the object-side surface of the first lens 710 and an object-side surface of the fourth lens 740. However, persons skilled in the art will appreciate that some variation in the aspherical surface coefficients may exist without departing from the results and benefits of the present third embodiment.

Figure 32:
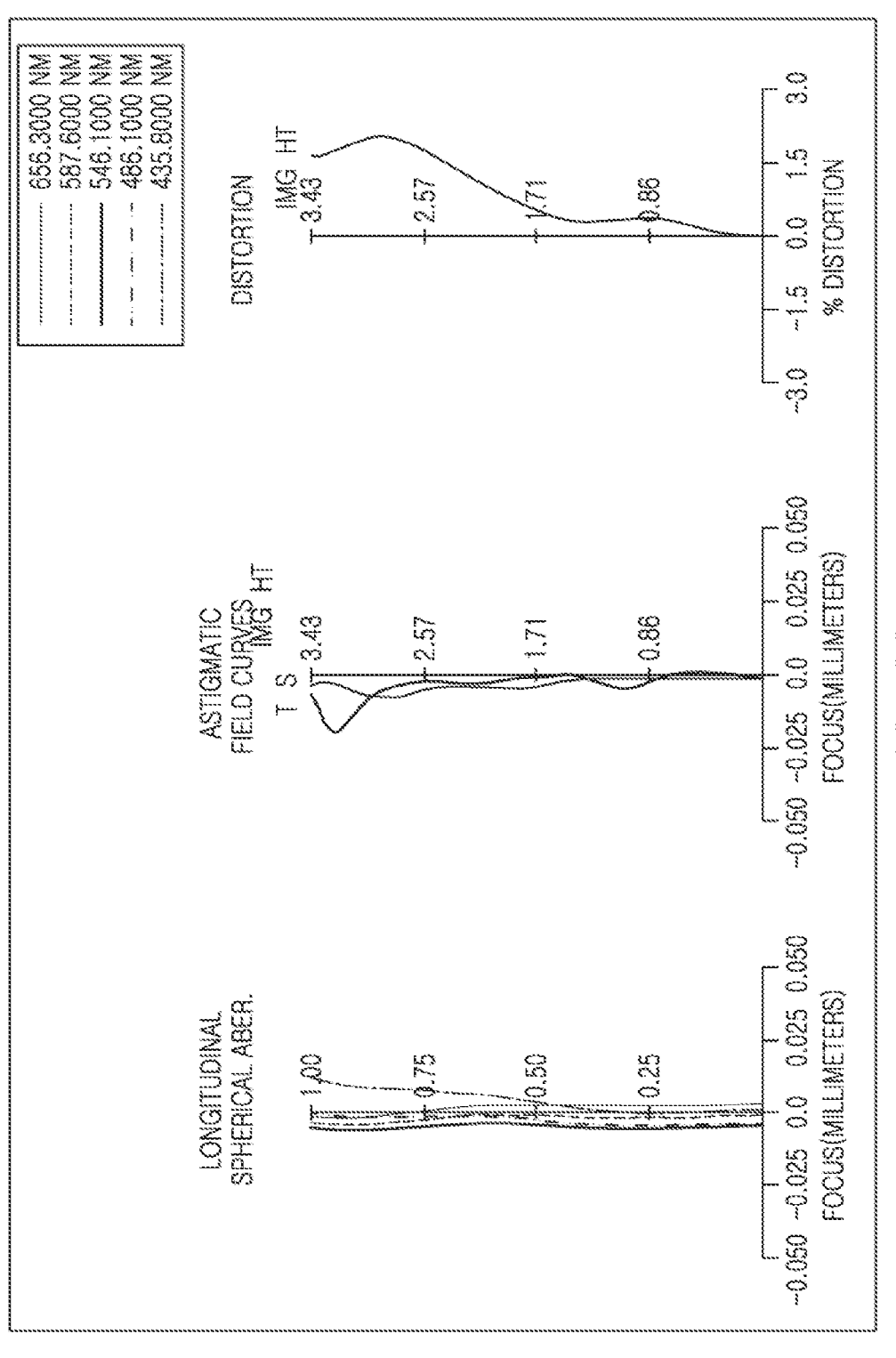
FIGS. 32 and 33 are graphs having curves representing aberration characteristics of the optical system illustrated in FIG. 31.
Figure 33:
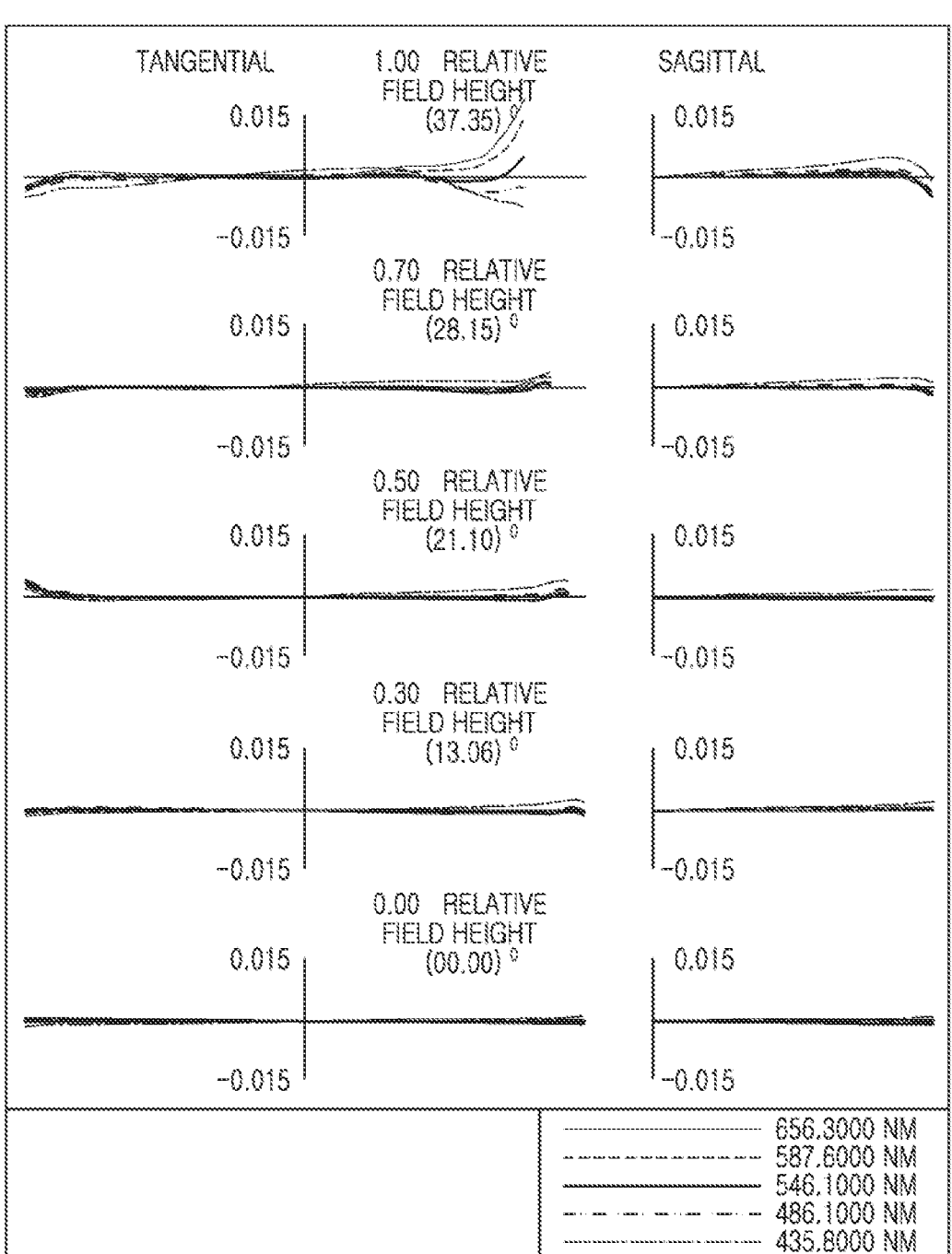
Figure 36:
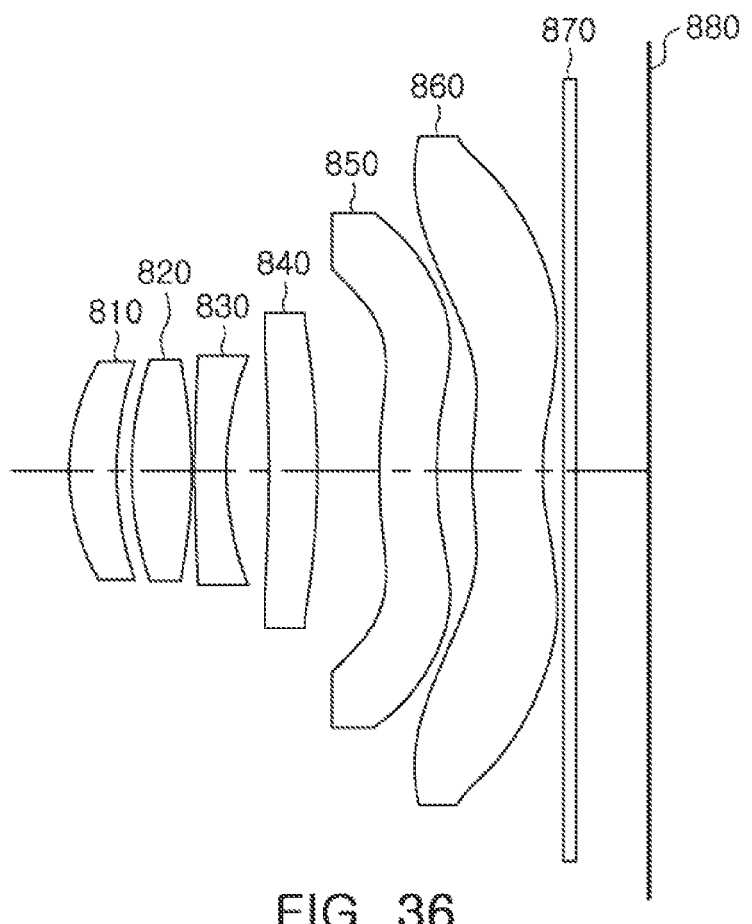
FIG. 36 is a view of an optical system, according to an eighth embodiment in the present disclosure.

In addition, the optical system configured as described above may have aberration characteristics illustrated in FIGS. 32 and 33. However, persons skilled in the art will appreciate that some variation in the aberration characteristics may exist without departing from the results and benefits of the present third embodiment.

An optical system, according to an eighth embodiment, will be described with reference to FIGS. 36 through 40.

The optical system, according to the eighth embodiment, includes a first lens 810, a second lens 820, a third lens 830, a fourth lens 840, a fifth lens 850, and a sixth lens 860. The optical system also includes a stop, an infrared cut-off filter 870, and an image sensor 880.

As illustrated in Table 8, a focal length (f1) of the first lens 810 is 11.048 mm, a focal length (f2) of the second lens 820 is 3.585 mm, a focal length (f3) of the third lens 830 is −5.164 mm, a focal length (f4) of the fourth lens 840 is 19.478 mm, a focal length (f5) of the fifth lens 850 is −47.865 mm, a focal length (f6) of the sixth lens 860 is −9.028 mm, and an overall focal length (f) of the optical system is 4.315 mm.

TABLE 8

| | |
|---|---|
| f1 | 11.048 |
| f2 | 3.585 |
| f3 | −5.164 |
| f4 | 19.478 |
| f5 | −47.865 |
| f6 | −9.028 |
| f | 4.315 |

In this example, respective characteristics, such as radii of curvature, thicknesses of lenses or distances between the lenses, refractive indices, and Abbe numbers, of lenses are illustrated in FIG. 39.

In the eighth embodiment, the first lens 810 has positive refractive power and has a meniscus shape of which an object-side surface is convex. For example, a first surface of the first lens 810 is convex, and a second surface of the first lens 810 is concave.

The second lens 820 has a positive refractive power, and the first and second surfaces thereof are convex. The third lens 830 has a negative refractive power and has a meniscus shape of which an object-side surface is convex. For example, a first surface of the third lens 830 is convex, and a second surface of the third lens 830 is concave.

The fourth lens 840 has a positive refractive power, and both surfaces thereof may be convex. For example, first and second surfaces of the fourth lens 840 are convex.

The fifth lens 850 has a negative refractive power and has a meniscus shape of which an object-side surface is convex. For example, a first surface of the fifth lens 850 is convex, and a second surface of the fifth lens 850 is concave. In addition, at least one inflection point is formed on at least one of the first and second surfaces of the fifth lens 850.

The sixth lens 860 has a negative refractive power and has a meniscus shape of which an object-side surface is convex. For example, a first surface of the sixth lens 860 is convex, and a second surface of the sixth lens 860 is concave. In addition, at least one inflection point is formed on at least one of the first and second surfaces of the sixth lens 860. For instance, a first surface of the sixth lens 860 is convex in the paraxial region, and a second surface of the sixth lens is concave in the paraxial region.

Further, the respective surfaces of the first to sixth lenses 810 to 860 have aspherical surface coefficients as illustrated in FIG. 40. That is, each of the first surface of the first lens 810 to the second surface of the sixth lens 860 is aspherical. However, persons skilled in the art will appreciate that some variation in the aspherical surface coefficients may exist without departing from the results and benefits of the present eighth embodiment.

In addition, the stop is disposed between the object-side surface of the first lens 810 and an object-side surface of the fourth lens 840.

Figure 37:
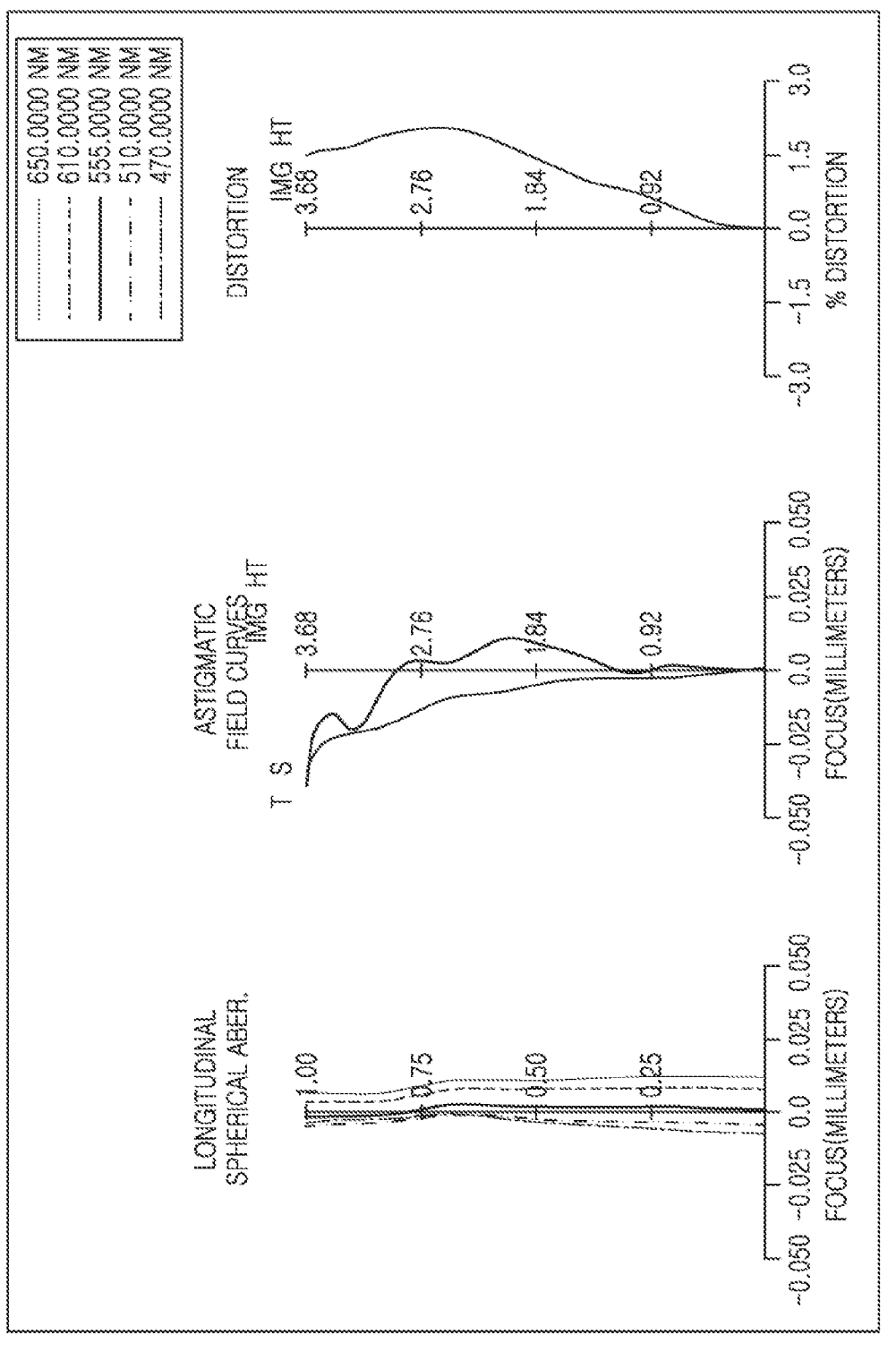
FIGS. 37 and 38 are graphs having curves representing aberration characteristics of the optical system illustrated in FIG. 36.
Figure 38:
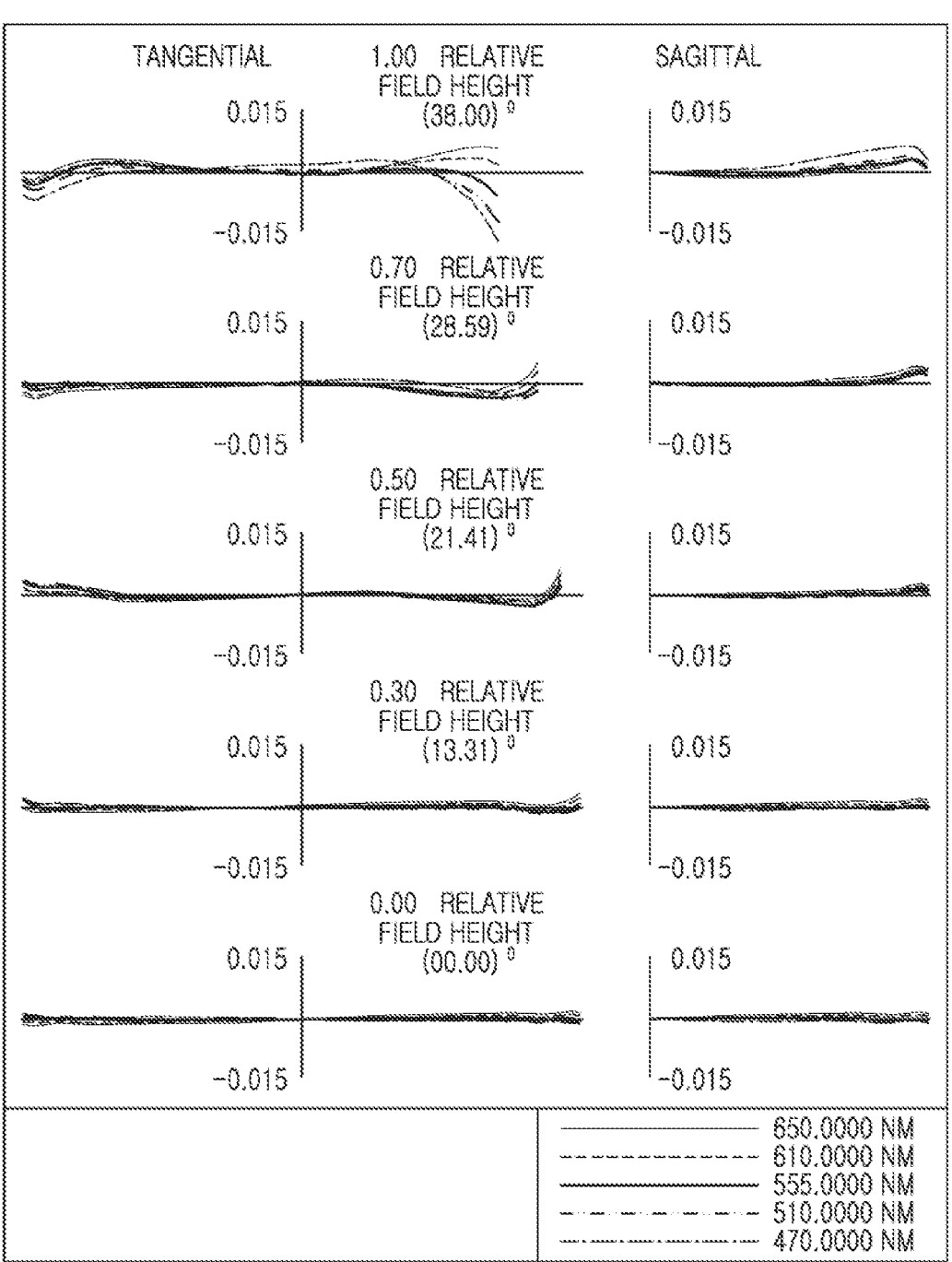
Figure 41:
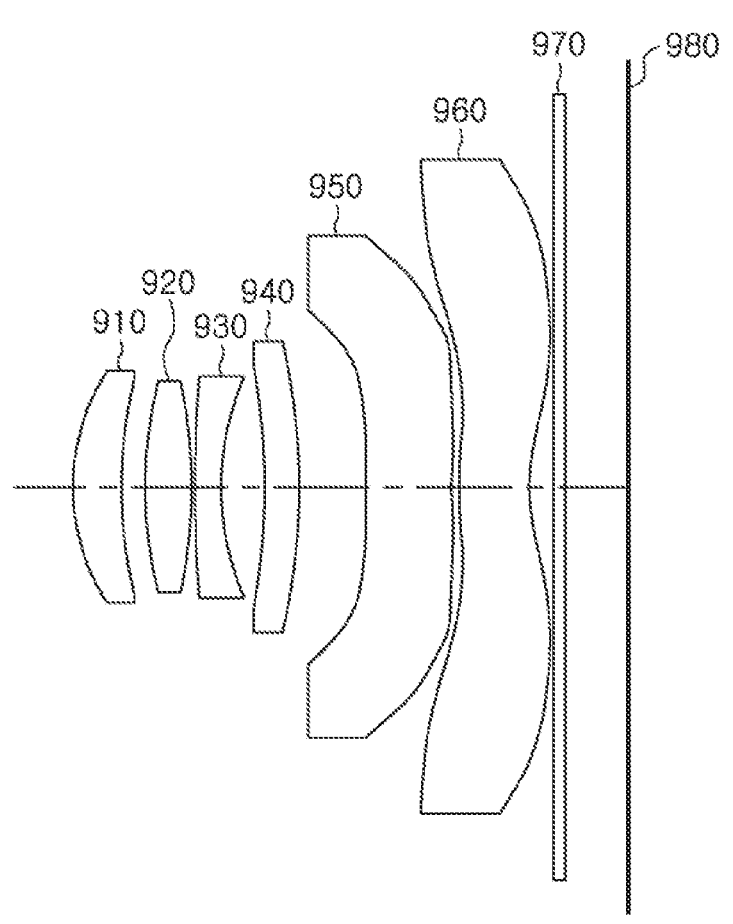
FIG. 41 is a view of an optical system, according to a ninth embodiment.

In addition, the optical system configured as described above includes aberration characteristics illustrated in FIGS. 37 and 38. However, persons skilled in the art will appreciate that some variation in the aberration characteristics may exist without departing from the results and benefits of the present eight embodiment.

An optical system, according to a ninth embodiment, will be described with reference to FIGS. 41 through 45.

The optical system, according to the ninth embodiment, includes a first lens 910, a second lens 920, a third lens 930, a fourth lens 940, a fifth lens 950, and a sixth lens 960. The optical system further includes a stop, an infrared cut-off filter 970, and an image sensor 980.

As illustrated in Table 8, a focal length (f1) of the first lens 910 is 7.065 mm, a focal length (f2) of the second lens 920 is 5.308 mm, a focal length (f3) of the third lens 930 is −6.922 mm, a focal length (f4) of the fourth lens 940 is 20.735 mm, a focal length (f5) of the fifth lens 950 is −199.493 mm, a focal length (f6) of the sixth lens 960 is −6.434 mm, and an overall focal length (f) of the optical system is 4.725 mm.

TABLE 9

| | |
|---|---|
| f1 | 7.065 |
| f2 | 5.308 |
| f3 | −6.922 |
| f4 | 20.735 |
| f5 | −199.493 |
| f6 | −6.434 |
| f | 4.725 |

In this example, respective characteristics, such as radii of curvature, thicknesses of lenses or distances between the lenses, refractive indices, and Abbe numbers, of lenses are illustrated in FIG. 44.

In the ninth embodiment, the first lens 910 has a positive refractive power and has a meniscus shape of which an object-side surface is convex. For example, a first surface of the first lens 910 is convex, and a second surface of the first lens 910 is concave.

The second lens 920 has a positive refractive power, and the first and second surfaces thereof are convex.

The third lens 930 has a negative refractive power and has a meniscus shape of which an object-side surface is convex. For example, a first surface of the third lens 930 is convex, and a second surface of the third lens 930 is concave.

The fourth lens 940 has a positive refractive power and has a meniscus shape of which an image-side surface is convex. For example, a first surface of the fourth lens 940 is concave, and a second surface of the fourth lens 940 is convex.

The fifth lens 950 has a negative refractive power, and the first and second surfaces thereof are concave. In addition, at least one inflection point is formed on at least one of the first and second surfaces of the fifth lens 950.

The sixth lens 960 has a negative refractive power and has a meniscus shape of which an object-side surface is convex. For example, a first surface of the sixth lens 960 is convex, and a second surface of the sixth lens 960 is concave. In addition, at least one inflection point is formed on at least one of the first and second surfaces of the sixth lens 960. For instance, a first surface of the sixth lens 960 is convex in the paraxial region, and a second surface of the sixth lens is concave in the paraxial region.

Further, the respective surfaces of the first to sixth lenses 910 to 960 have aspherical surface coefficients as illustrated in FIG. 45. That is, all of the first surface of the first lens 910 to the second surface of the sixth lens 960 are aspherical. However, persons skilled in the art will appreciate that some variation in the aspherical surface coefficients may exist without departing from the results and benefits of the present eighth embodiment.

In addition, the stop is disposed between the object-side surface of the first lens 910 and an object-side surface of the fourth lens 940.

Figure 42:
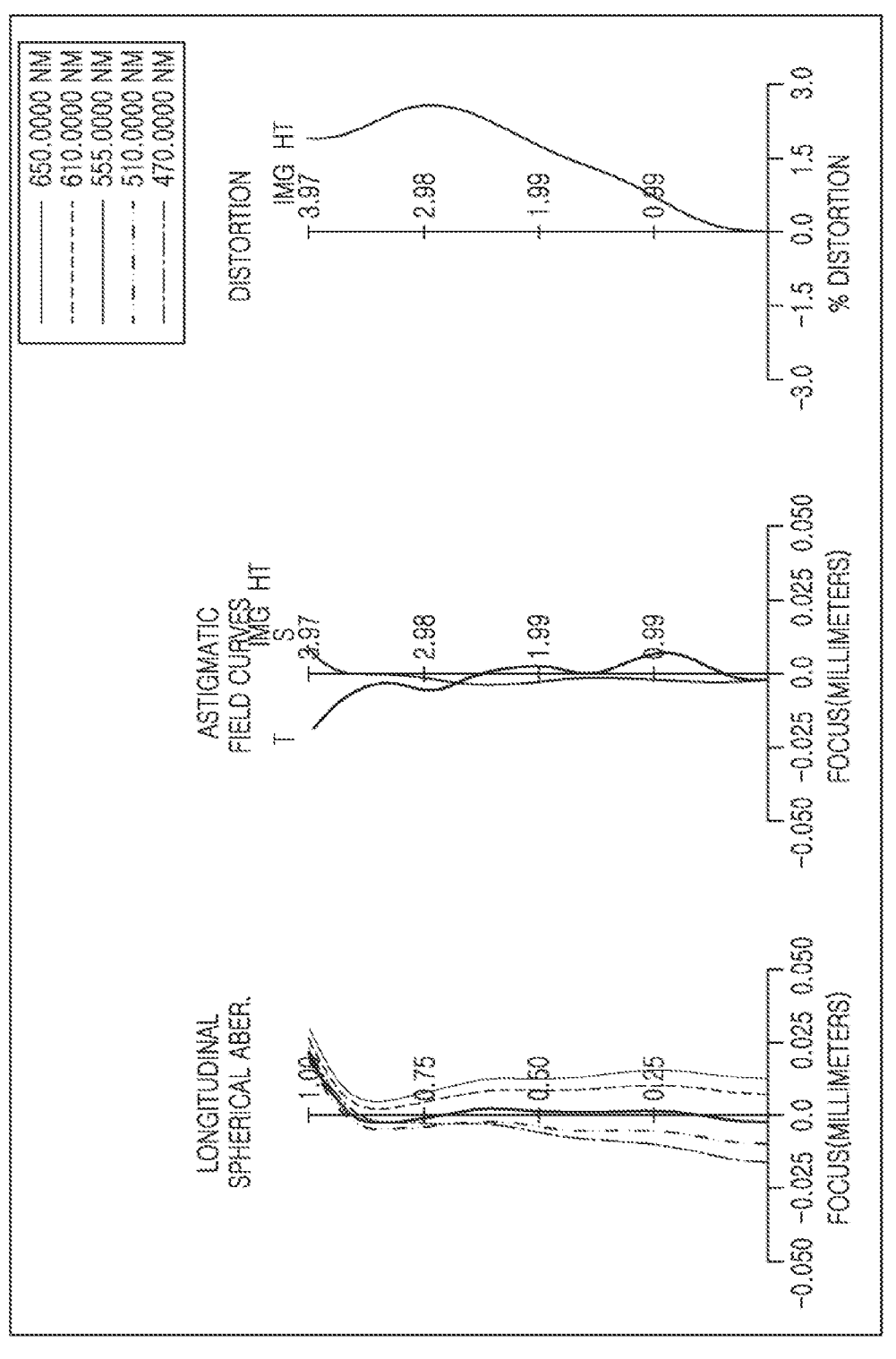
FIGS. 42 and 43 are graphs having curves representing aberration characteristics of the optical system illustrated in FIG. 41.
Figure 43:
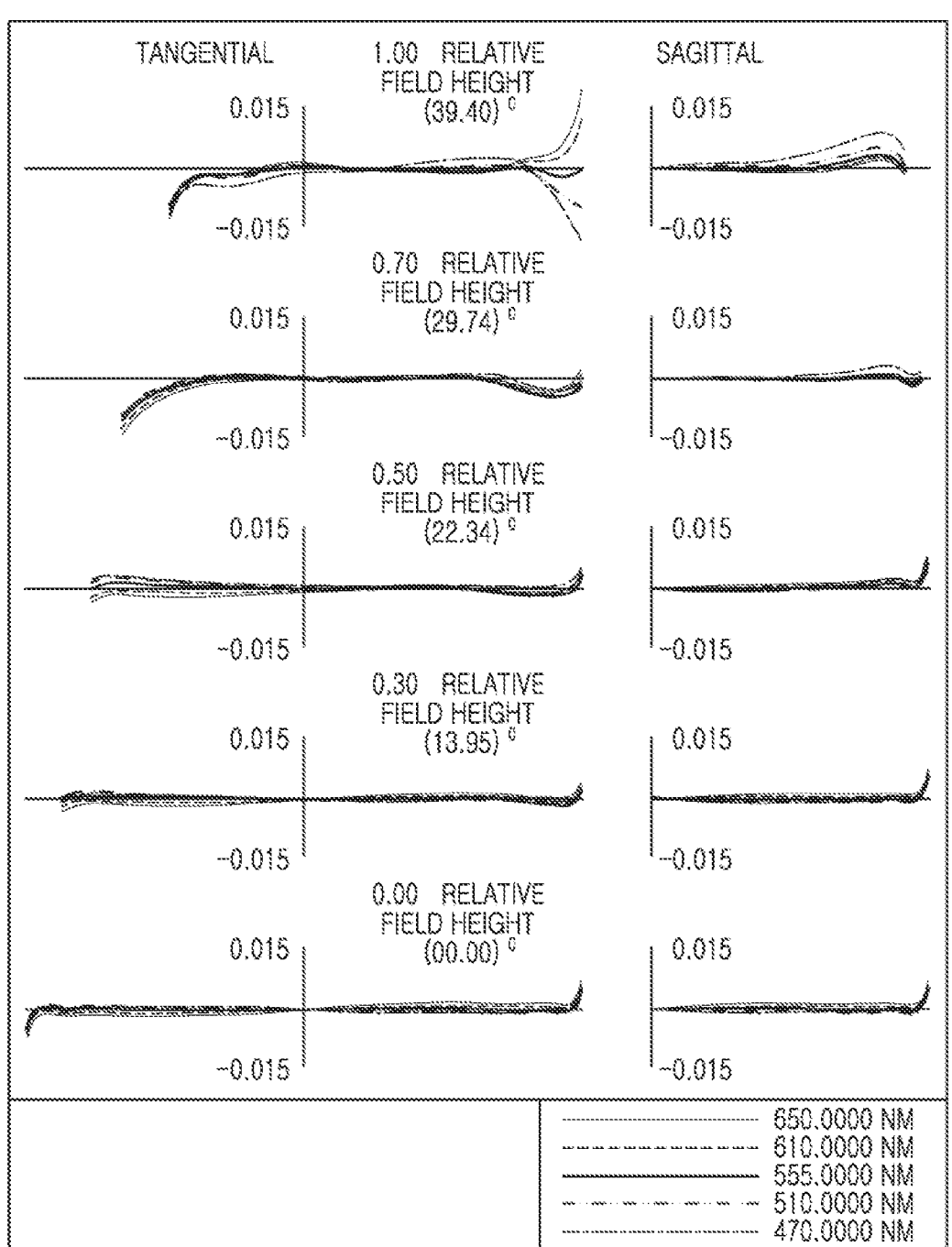

In addition, the optical system configured as described above has aberration characteristics illustrated in FIGS. 42 and 43. However, persons skilled in the art will appreciate that some variation in the aberration characteristics may exist without departing from the results and benefits of the present eighth embodiment.

Further, persons skilled in the art will appreciate from Table 10 that the optical systems, according to the first through ninth embodiments, satisfy the above-mentioned Conditional Expressions.

For reference, TTL is a distance from an object-side surface of the first lens to an imaging surface of the image sensor, and f is an overall focal length of the optical system including the first to sixth lenses.

In addition, f1 is a focal length of the first lens, f2 is a focal length of the second lens, f3 is a focal length of the third lens, and f4 is a focal length of the fourth lens, f5 is a focal length of the fifth lens. Furthermore, f6 is a focal length of the sixth lens, f12 is a synthetic focal length of the first and second lenses, f34 is a synthetic focal length of the third and fourth lenses, and f56 is a synthetic focal length of the fifth and sixth lenses.

Also, ImgH is half a diagonal length of the imaging surface of the image sensor, HFOV is a half field of view of the optical system, according to the first through ninth embodiments, v12 is an average value of an Abbe number of the first lens and an Abbe number of the second lens. In addition, v34 is an average value of an Abbe number of the third lens and an Abbe number of the fourth lens.

In one configuration, r1 is a radius of curvature of the object-side surface of the first lens, r2 is a radius of curvature of an image-side surface of the first lens, r3 is a radius of curvature of an object-side surface of the second lens, and r4 is a radius of curvature of an image-side surface of the second lens. In addition, r7 is a radius of curvature of an object-side surface of the fourth lens, r8 is a radius of curvature of an image-side surface of the fourth lens, r9 is a radius of curvature of an object-side surface of the fifth lens, r10 is a radius of curvature of an image-side surface of the fifth lens, and r12 is a radius of curvature of an image-side surface of the sixth lens.

In an example, BFL is a distance from the image-side surface of the sixth lens to the imaging surface of the image sensor, DL is a distance from the object-side surface of the first lens to the image-side surface of the sixth lens, v4 is an Abbe number of the fourth lens, and v5 is an Abbe number of the fifth lens.

mirror the image-side surface or the second surface of the sixth lens, thereby forming an integral part of the sixth lens.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

In a further alternative embodiment, two or more of the lenses of the first to sixth lenses may be configured as a group and in operative connection or contact with another lens. For instance, the first, second, and third lenses may be in contact with each other as a first group lens, while the fourth, fifth, and sixth lenses are configured separate from each other and from the first group lens. In the alternative, the first, second, and third lenses may be in contact with each other as a first group lens, the fourth and the fifth lenses may be in contact with each other as a second group lens, and the sixth lens is configured separate from the first and second group lenses.

As set forth above, in an optical system, according to various embodiments, an aberration improvement effect and a high level of resolution is realized.

In addition, the optical system may be slim, realize a wide field of view, and increase mass production yield by decreas-

TABLE 10

| | Exemplary Embodiments | | | | | | | | |
|---|---|---|---|---|---|---|---|---|---|
| | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eighth Exemplary Embodiment | Ninth Exemplary Embodiment |
| TTL/f | 1.2104 | 1.1958 | 1.1673 | 1.2003 | 1.2078 | 1.1706 | 1.1761 | 1.1520 | 1.1597 |
| f12 | 2.76 | 2.81 | 2.73 | 2.76 | 2.66 | 265 | 2.87 | 2.94 | 3.28 |
| f34 | −5.32 | −5.77 | −5.90 | −5.25 | −4.93 | −5.48 | −5.79 | −7.37 | −10.99 |
| f56 | −11.03 | −11.56 | −11.69 | −9.94 | −12.51 | −10.35 | −8.26 | −7.80 | −6.23 |
| f/f12 | 1.5577 | 1.4885 | 1.5061 | 1.5686 | 1.5561 | 1.5486 | 1.5414 | 1.4671 | 1.4398 |
| f/f34 | −0.8066 | −0.7244 | −0.6963 | −0.8244 | −0.8400 | −0.7486 | −0.7639 | −0.5851 | −0.4298 |
| f/f56 | −0.3892 | −0.3614 | −0.3518 | −0.4354 | −0.3308 | −0.3961 | −0.5351 | −0.5533 | −0.7588 |
| f1/f | 1.7111 | 1.8510 | 1.9140 | 1.7990 | 1.6742 | 2.1437 | 1.6620 | 2.5604 | 1.4951 |
| f2/f | 0.9251 | 0.9557 | 0.9268 | 0.8882 | 0.9392 | 0.8471 | 0.9539 | 0.8309 | 1.1233 |
| f3/f | −1.0887 | −1.1859 | −1.2169 | −1.0462 | −1.1107 | −1.1664 | −1.1750 | −1.1967 | −1.4649 |
| f4/f | 10.4115 | 9.4016 | 9.8604 | 8.4269 | 19.3981 | 11.4706 | 15.6861 | 4.5142 | 4.3880 |
| f/f1 | 0.5844 | 0.5402 | 0.5225 | 0.5559 | 0.5973 | 0.4665 | 0.6017 | 0.3906 | 0.6689 |
| \|f/f3\| | 0.9185 | 0.8432 | 0.8217 | 0.9559 | 0.9003 | 0.8573 | 0.8510 | 0.8356 | 0.6826 |
| \|f/f5\| + \|f/f6\| | 0.3915 | 0.3628 | 0.3516 | 0.4411 | 0.3311 | 0.4054 | 0.5557 | 0.5681 | 0.7582 |
| TTL/2ImgH | 0.7581 | 0.7287 | 0.6999 | 0.7581 | 0.7293 | 0.7001 | 0.7583 | 0.7250 | 0.6900 |
| HFOV | 38.60 | 39.37 | 39.83 | 38.37 | 39.63 | 39.90 | 37.79 | 38.47 | 40.04 |
| v12 − v34 | 32.88 | 32.88 | 32.88 | 32.88 | 32.88 | 32.88 | 32.88 | 34.59 | 34.59 |
| \|f/f3\| + \|f/f4\| | 1.0146 | 0.9496 | 0.9232 | 1.0745 | 0.9519 | 0.9445 | 0.9148 | 1.0571 | 0.9105 |
| r12/f | 0.3624 | 0.3467 | 0.3526 | 0.3642 | 0.3660 | 0.3397 | 0.3435 | 0.3953 | 0.3709 |
| \|f1/f3\| | 1.5716 | 1.5608 | 1.5729 | 1.7196 | 1.5073 | 1.8379 | 1.4145 | 2.1395 | 1.0206 |
| (r9 − r10)/(r9 + r10) | 0.0985 | 0.0870 | 0.0729 | 0.0972 | 0.0959 | 0.0823 | 0.1067 | 0.0821 | 1.3557 |
| \|f/f1\| + \|f/f2\| | 1.6654 | 1.5866 | 1.6015 | 1.6817 | 1.6621 | 1.6470 | 1.6500 | 1.5941 | 1.5591 |
| (\|f1\| + \|f2\|)/ (\|f3\| + \|f4\|) | 0.2292 | 0.2651 | 0.2565 | 0.2837 | 0.1274 | 0.2367 | 0.1551 | 0.5938 | 0.4474 |
| (r3 + r4)/(r3 − r4) | −0.2036 | −0.2839 | −0.3611 | −0.2971 | −0.1118 | −0.2546 | −0.2932 | −0.6012 | −0.5185 |
| BFL/TTL | 0.1769 | 0.1929 | 0.2171 | 0.1676 | 0.1848 | 0.2039 | 0.1594 | 0.1832 | 0.1778 |
| (r7 − r8)/(r7 + r8) | 0.4418 | 0.9920 | 0.1382 | −2.3130 | 0.3392 | 0.1431 | −2.0594 | 1.3333 | 0.5272 |
| \|f/f4\| + \|f/ f5\| + \|f/f6\| | 0.4875 | 0.4692 | 0.4530 | 0.5598 | 0.3826 | 0.4926 | 0.6194 | 0.7896 | 0.9861 |
| (r1 + r2)/(r1 − r2) | −2.4887 | −2.8267 | −3.1678 | −2.8148 | −2.5156 | −3.7071 | −2.7236 | −7.6703 | −3.2966 |
| DL/f | 0.9963 | 0.9652 | 0.9138 | 0.9991 | 0.9846 | 0.9320 | 0.9887 | 0.9409 | 0.9536 |
| v4 + v5 | 46.46 | 46.46 | 46.46 | 46.46 | 46.46 | 46.46 | 46.46 | 43.04 | 43.04 |
| \|f5/f\| | 11.7081 | 12.0291 | 12.2234 | 11.6078 | 12.1412 | 12.2424 | 11.3599 | 11.0930 | 42.2181 |

Although in the embodiments described above with respect to FIGS. 1 through 45, the sixth lens to be in contact to the infrared cut-off filter, the sixth lens may be placed at a distance from the infrared cut-off filter. In an alternative embodiment, the infrared cut-off filter may be shaped to ing respective sensitivities of lenses to secure tolerance control at the time at which the lenses are assembled.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system comprising:
a first lens comprising positive refractive power, a convex object-side surface in a paraxial region thereof and a concave image-side surface in the paraxial region thereof;
a second lens comprising positive refractive power, a convex object-side surface in a paraxial region thereof and a convex image-side surface in the paraxial region thereof;
a third lens comprising negative refractive power, a convex object-side surface in a paraxial region thereof and a concave image-side surface in the paraxial region thereof;
a fourth lens comprising positive refractive power and a convex object-side surface in a paraxial region thereof;
a fifth lens comprising negative refractive power, a convex object-side surface in a paraxial region thereof and a concave image-side surface in the paraxial region thereof; and
a sixth lens comprising negative refractive power,
wherein the first to sixth lenses are sequentially disposed from an object side to an image side,
wherein the optical system has a total of six lenses,
wherein among the first to sixth lenses, the fifth lens has a largest absolute focal length value,
wherein among the first to sixth lenses, the fourth lens has a second largest absolute focal length value,
wherein $0.5<f/f12<2.5$ is satisfied, where f is an overall focal length of the optical system, and f12 is a synthetic focal length of the first and second lenses,
wherein $-2.5<f/f34<-0.2$ is satisfied, where f34 is a synthetic focal length of the third and fourth lenses,
wherein $0.35<TTL/(2*ImgH)<0.95$ is satisfied, where TTL is a distance from the object-side surface of the first lens to an imaging surface of an image sensor, and ImgH is half a diagonal length of the imaging surface of the image sensor, and wherein $1.4<Fno<2.2$ is satisfied, where Fno is a constant indicating brightness of the optical system.

2. The optical system of claim 1, wherein $0.95<TTL/f<1.45$ is satisfied, where TTL is a distance from the object-side surface of the first lens to an imaging surface of an image sensor.

3. The optical system of claim 1, wherein $0<|f1/f3|<25$ is satisfied, where f1 is a focal length of the first lens and f3 is a focal length of the third lens.

4. The optical system of claim 3, wherein $0<f/f1<1.5$ is satisfied.

5. The optical system of claim 1, wherein $0.2<|f/f3|<2.5$ is satisfied, where f3 is a focal length of the third lens.

6. The optical system of claim 1, wherein $0.2<|f/f5|+|f/f6|<6.0$ is satisfied, where f5 is a focal length of the fifth lens and f6 is a focal length of the sixth lens.

7. The optical system of claim 6, wherein $|f5/f|>2$ is satisfied.

8. The optical system of claim 1, wherein $0<|f/f3|+|f/f4|<3$ is satisfied, where f3 is a focal length of the third lens and f4 is a focal length of the fourth lens.

9. The optical system of claim 1, wherein $0.15<r12/f<0.9$ is satisfied, where r12 is a radius of curvature of an image-side surface of the sixth lens.

10. The optical system of claim 1, wherein $0<(r9-r10)/(r9+r10)<2.5$ is satisfied, where r9 is a radius of curvature of the object-side surface of the fifth lens and r10 is a radius of curvature of the image-side surface of the fifth lens.

11. The optical system of claim 1, wherein $0.2<|f/f1|+|f/f2|<4$ is satisfied, where f1 is a focal length of the first lens and f2 is a focal length of the second lens.

12. The optical system of claim 1, wherein $0.7<DL/f<1.2$ is satisfied, where DL is a distance from the object-side surface of the first lens to an image-side surface of the sixth lens.

13. The optical system of claim 1, wherein $42<v4+v5<115$ is satisfied, where v4 is an Abbe number of the fourth lens and v5 is an Abbe number of the fifth lens.

14. The optical system of claim 1, wherein $10<v12-v34<45$ is satisfied, where v12 is an average value of an Abbe number of the first lens and an Abbe number of the second lens, and v34 is an average value of an Abbe number of the third lens and an Abbe number of the fourth lens.

15. The optical system of claim 1, wherein $65°<FOV<100°$ is satisfied, where FOV is a field of view of the optical system.

16. The optical system of claim 1, wherein the fourth lens comprises a convex image-side surface in a paraxial region thereof.

17. The optical system of claim 1, wherein the sixth lens comprises a convex object-side surface in a paraxial region thereof and a concave image-side surface in the paraxial region thereof.

* * * * *